(12) United States Patent
Shimamura et al.

(10) Patent No.: US 9,350,008 B2
(45) Date of Patent: *May 24, 2016

(54) AUTOMOBILE CELL AND RELATED METHOD

(71) Applicant: NISSAN MOTOR CO., LTD., Yokohama-shi, Kanagawa-ken (JP)

(72) Inventors: Osamu Shimamura, Yokohama (JP); Hiroshi Sugawara, Yokosuka (JP); Hideaki Horie, Yokosuka (JP); Tomaru Ogawa, Yokohama (JP); Takaaki Abe, Yokosuka (JP); Takanori Ito, Zushi (JP)

(73) Assignee: NISSAN MOTOR CO., LTD., Kanagawa-Ken (JP)

( * ) Notice: Subject to any disclaimer, the term of this patent is extended or adjusted under 35 U.S.C. 154(b) by 35 days.

This patent is subject to a terminal disclaimer.

(21) Appl. No.: 14/142,472

(22) Filed: Dec. 27, 2013

(65) Prior Publication Data

US 2014/0113178 A1    Apr. 24, 2014

Related U.S. Application Data

(63) Continuation of application No. 10/662,511, filed on Jul. 21, 2003, now Pat. No. 8,753,767.

(30) Foreign Application Priority Data

Aug. 5, 2002  (JP) ............... P2002-227423

(51) Int. Cl.
*H01M 2/02* (2006.01)
*H01M 2/00* (2006.01)
(Continued)

(52) U.S. Cl.
CPC .............. *H01M 2/206* (2013.01); *H01M 2/021* (2013.01); *H01M 2/024* (2013.01);
(Continued)

(58) Field of Classification Search
None
See application file for complete search history.

(56) References Cited

U.S. PATENT DOCUMENTS

| | | | |
|---|---|---|---|
| 2,381,140 A | 8/1945 | Proctor | |
| 4,769,299 A | 9/1988 | Nelson | |

(Continued)

FOREIGN PATENT DOCUMENTS

| | | | |
|---|---|---|---|
| JP | 11-154534 | 6/1999 | |
| JP | 11-224652 | 8/1999 | |

(Continued)

OTHER PUBLICATIONS

Office Action issued in U.S. Appl. No. 10/622,511 dated Nov. 3, 2011.

(Continued)

*Primary Examiner* — Cynthia K Walls
(74) *Attorney, Agent, or Firm* — McDermott Will & Emery LLP

(57) ABSTRACT

An automobile cell is provided with an electric power generating element composed of a positive electrode having a positive electrode active substance layer, a negative electrode having a negative electrode active substance layer and a separator interposed between the electrodes, a cell outer sheath made of a laminate film compositely composed of polymer and metal, a positive electrode terminal lead electrically conductive with the positive electrode and extending to an outside of the cell outer sheath, and a negative electrode terminal lead electrically conductive with the negative electrode and extending to the outside of the cell outer sheath. The positive electrode and the negative electrode associated therewith via the separator defines a unit electrode, and the relationship between a thickness of the automobile cell and a sum of a thickness of the positive electrode active substance layer and a thickness of the negative electrode active substance layer of the unit electrodes, is defined such that a value obtained by dividing the former by the latter is equal to or less than 80.

13 Claims, 10 Drawing Sheets

(51) Int. Cl.
*H01M 2/20* (2006.01)
*H01M 2/30* (2006.01)
*H01M 10/04* (2006.01)
*H01M 6/40* (2006.01)
*H01M 10/0525* (2010.01)
*H01M 4/02* (2006.01)
*H01M 10/42* (2006.01)

(52) U.S. Cl.
CPC ........... *H01M 2/0257* (2013.01); *H01M 2/202* (2013.01); *H01M 2/30* (2013.01); *H01M 10/0413* (2013.01); *H01M 2/0287* (2013.01); *H01M 6/40* (2013.01); *H01M 10/0525* (2013.01); *H01M 2004/021* (2013.01); *H01M 2010/4292* (2013.01); *Y02E 60/122* (2013.01); *Y02T 10/7011* (2013.01); *Y10T 29/4911* (2015.01); *Y10T 29/49114* (2015.01)

(56) References Cited

U.S. PATENT DOCUMENTS

| | | | |
|---|---|---|---|
| 6,291,098 B1 | 9/2001 | Shibuya et al. |
| 6,372,377 B1 | 4/2002 | Ovshinsky et al. |
| 6,444,355 B1 | 9/2002 | Murai et al. |
| 6,544,682 B1 | 4/2003 | Takami et al. |
| 6,902,847 B1 | 6/2005 | Yata et al. |

FOREIGN PATENT DOCUMENTS

| | | |
|---|---|---|
| JP | 2000-315481 A | 11/2000 |
| JP | 2000-348772 A | 12/2000 |

OTHER PUBLICATIONS

Office Action issued in U.S. Appl. No. 10/622,511 dated Apr. 27, 2011.
Office Action issued in U.S. Appl. No. 10/622,511 dated Sep. 13, 2010.
Office Action issued in U.S. Appl. No. 10/622,511 dated Mar. 5, 2010.
Office Action issued in U.S. Appl. No. 10/622,511 dated Sep. 1, 2009.
Office Action issued in U.S. Appl. No. 10/622,511 dated Feb. 18, 2009.
Office Action issued in U.S. Appl. No. 10/622,511 dated Aug. 19, 2008.
Office Action issued in U.S. Appl. No. 10/622,511 dated Aug. 9, 2007.
Office Action issued in U.S. Appl. No. 10/622,511 dated Feb. 8, 2007.
Office Action issued in U.S. Appl. No. 10/622,511 dated Aug. 11, 2006.
Office Action issued in U.S. Appl. No. 10/622,511 dated Mar. 1, 2006.

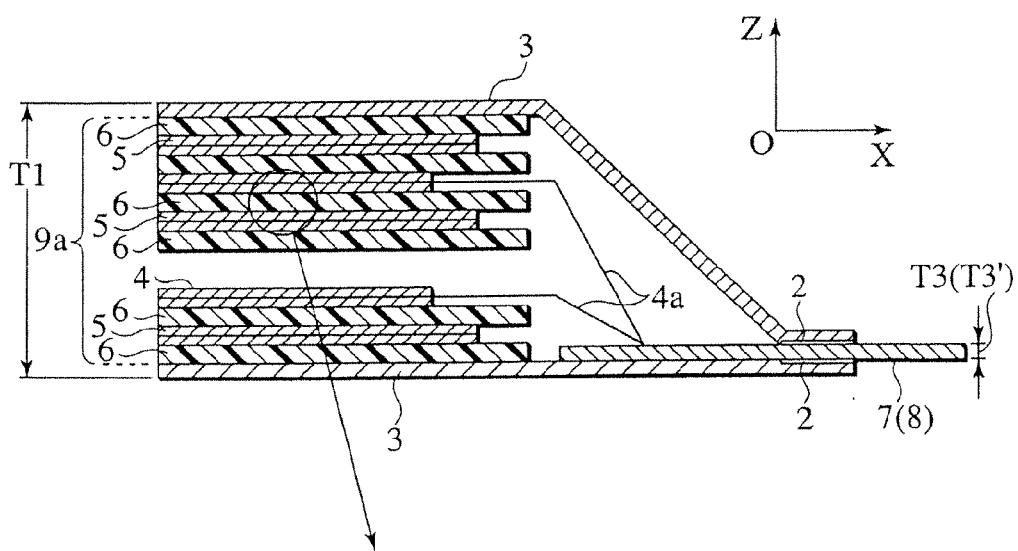
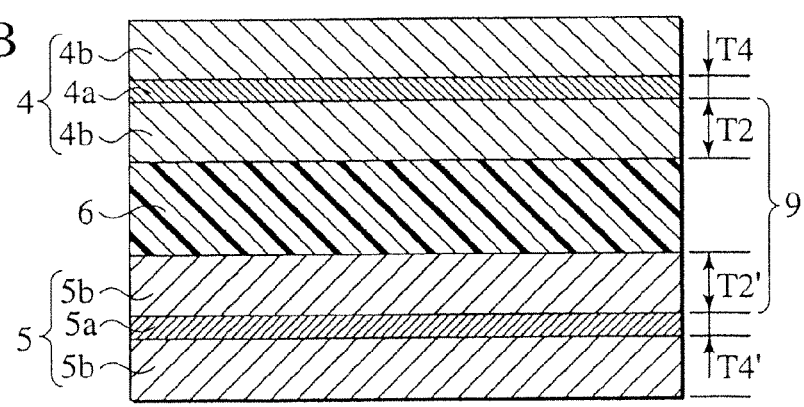

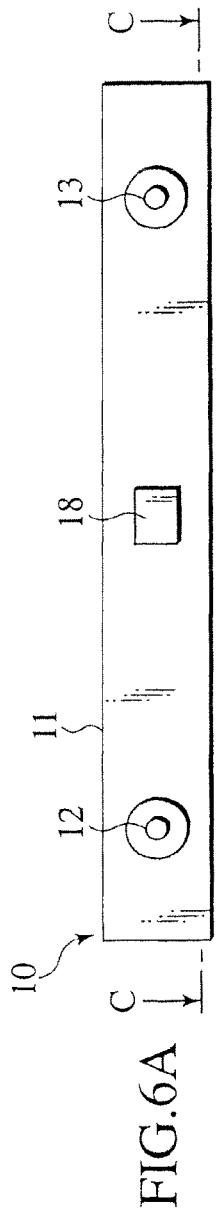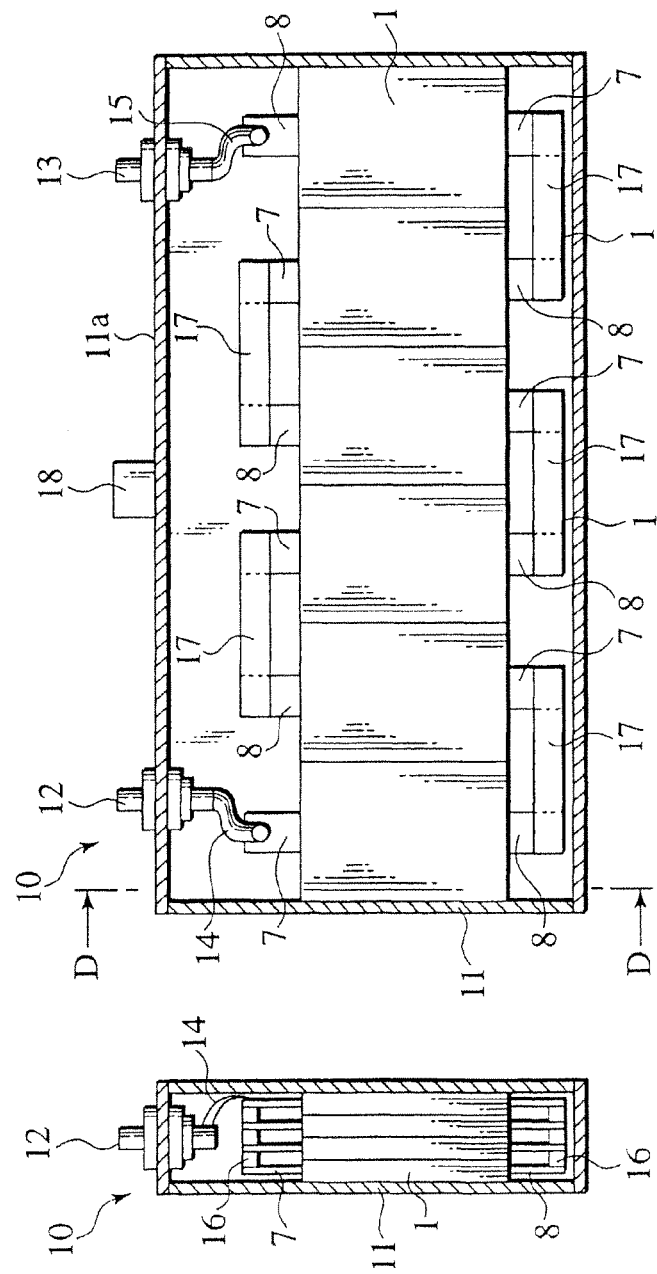

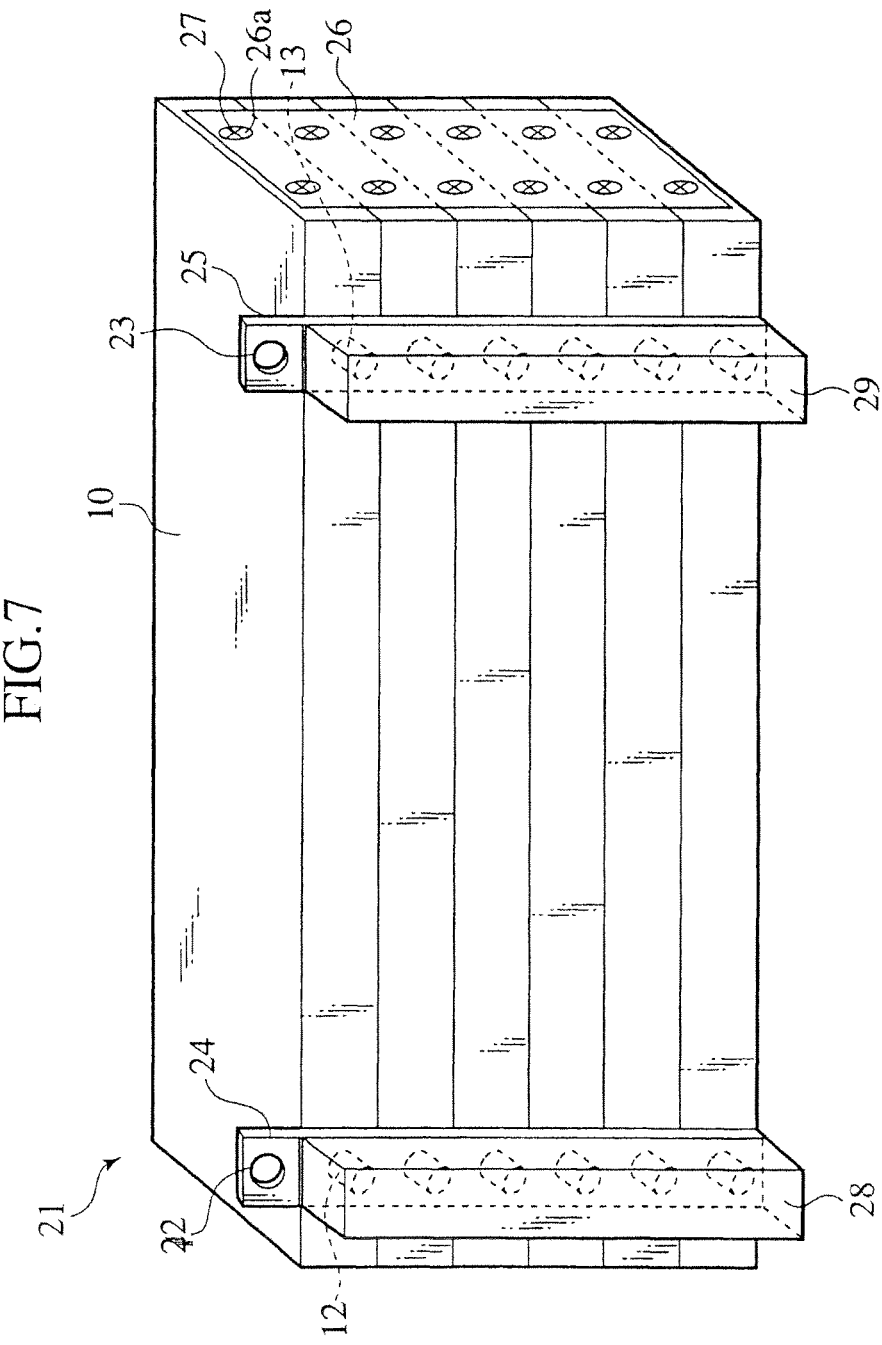

AUTOMOBILE CELL AND RELATED METHOD

CROSS REFERENCE TO RELATED APPLICATIONS

This application is a Continuation application of U.S. Ser. No. 10/622,511 filed Jul. 21, 2003, now U.S. Pat. No. 8,753,767, which claims priority from Japanese Patent Application No. P2002-227423 filed Aug. 5, 2002. The subject matter of each is incorporated by reference in entirety.

BACKGROUND OF THE INVENTION

The present invention relates to an automobile cell and a related method and, more particularly, to a flat type automobile cell and its related method wherein use is made for a laminate film, compositely made from a polymer and a metal, as a cell outer sheath to provide an optimum structure for application to a drive source for a motor of an electric vehicle, a hybrid vehicle or a fuel cell-powered vehicle, or for application to a storage battery thereof.

In recent years, among increasing trends in which environmental protection movements and air pollutions caused by exhaust gases of automobiles attract public attention worldwide, research and development works have heretofore been ardently made to provide an electric vehicle (EV) powered by a power source energized by an electricity, a hybrid vehicle (HEV) adapted to travel in combination with an engine and a motor and a fuel cell powered vehicle (FCV) powered by a prime power source energized by a fuel cell.

Thus, it is said that the research and development works for cells available to be installed on such vehicles and each having a high energy density and high power output progressively share a further important role in industrial fields.

As the cells for such applications, it is a general practice to use a secondary cell available to achieve repeated operations in charging and discharging cycles. The cell is comprised of a structure wherein a wound electric power generating element is accommodated in a cylindrical type outer sheath case and a structure wherein the wound electric power generating element or an electric power generating element, in which planar plate shaped electrode and separators are stacked, are accommodated in a flat type outer sheath case.

Because of an adequate strength required in the cylindrical type or the flat type outer sheath case, Japanese Patent Application Laid-Open Publication No. 2000-348772 discloses a structure that employs an outer sheath case made of metallic vessel.

Further, in order for the cell to have a light weight while ensuring a high energy density and high power output, Japanese Patent Application Laid-Open Publication No. 11-224652 discloses a gas-tightly sealed structure wherein a laminate film is used as an outer sheath case with circumferentially peripheral portions thereof being thermally welded to providing a sealing effect.

SUMMARY OF THE INVENTION

However, upon studies conducted by the present inventors, there is a need for taking out a large electric current from the cell in application where the high power output and high energy density are required as in a motor drive power supply of EV, HEV and FCV. Here, when using large metallic wires or metallic bars as electrode terminals, from which electric current is taken out to the outside, of the cell having the cell outer sheath case formed of a polymer-metal composite laminate film, it is required for the cell to have adequate sealing properties at sealed portions of the electrode terminals that protrude from the cell outer sheath case.

Further, with the cell having the cell outer sheath case formed of such a laminate film, since the laminate film has a poor rigidity, it is liable to be readily deformed upon receipt of external forces. For this reason, it is conceived that excessive deformation may occur and adversely affect on a cell internal structure or thermally welded portions of the laminate film.

More particularly, with the cell in which, as in application such as EV, a large capacity is required, it is conceived that the cell tends to become large in size with consequences in a hard handling or a difficulty to be installed on the vehicle and, in addition, the automobile cell (cells) tends to have an increased thickness to deteriorate a heat dissipating property with a resultant adverse affect caused in a thermal performance with respect to the large electric current. Also, it is conceived that when repeatedly performing charging and discharging cycles at the large electric current, the temperature of the cell increases due to Joule's heat caused by internal resistance of the cell with a resultant adverse affect caused in a cell performance and the thermally welded portions.

The present invention has been completed upon the various studies conducted as set forth above by the present inventors and has an object to provide an automobile cell that is compact and light in weight to be easily installed on EV, HEV and FCV while, further, ensuring an adequate sealing property even in occurrence of flow of a large electric current and enabling a temperature rise of the cell to be limited even when repeatedly performing charging and discharging cycles at the large electric current, and its related method.

To achieve such an object, the present invention in one aspect provides an automobile cell comprising: an electric power generating element including a positive electrode having a positive electrode active substance layer, a negative electrode having a negative electrode active substance layer, and a separator interposed between the positive electrode and the negative electrode, the positive electrode, the negative electrode and the separator being stacked in a stack direction to allow the positive electrode and the negative electrode, opposing to the positive electrode via the separator, to define a unit electrode; a cell outer sheath made from a laminate film compositely composed of polymer and metal and welded to gas-tightly encapsulate the electric power generating element inside the cell outer sheath such that an automobile cell is formed in a flat shape with a thickness defined by the cell outer sheath along the stack direction; a positive electrode terminal lead electrically conductive with the positive electrode and sandwiched between welded portions, formed by the cell outer sheath that has been welded, and extending to an outside of the cell outer sheath; and a negative electrode terminal lead electrically conductive with the negative electrode and sandwiched between welded portions, formed by the cell outer sheath that has been welded, and extending to the outside of the cell outer sheath, wherein the relationship between the thickness of the automobile cell and a sum of a thickness of the positive electrode active substance layer and a thickness of the negative electrode active substance layer, along the stack direction of the unit electrodes, is defined such that a value obtained by dividing the thickness of the automobile cell by the sum of the thickness of the positive electrode active substance layer and the thickness of the negative electrode active substance layer is equal to or less than 80.

Meanwhile, the present invention in another aspect provide a method of manufacturing an automobile cell, the method comprising: preparing an electric power generating element including a positive electrode having a positive electrode active substance layer, a negative electrode having a negative electrode active substance layer, and a separator interposed between the positive electrode and the negative electrode, the positive electrode, the negative electrode and the separator being stacked in a stack direction to allow the positive electrode and the negative electrode, opposing to the positive electrode via the separator, to define a unit electrode; placing the electric power generating film in a cell outer sheath made from a laminate film compositely composed of polymer and metal; and welding the cell outer sheath to gas-tightly encapsulate the electric power generating element inside the cell outer sheath such that a positive electrode terminal lead electrically conductive with the positive electrode is sandwiched between the cell outer sheath to extend to an outside of the cell outer sheath, and a negative electrode terminal lead electrically conductive with the negative electrode is sandwiched between the cell outer sheath to extend to the outside of the cell outer sheath, wherein the relationship between the thickness of the automobile cell and a sum of a thickness of the positive electrode active substance layer and a thickness of the negative electrode active substance layer, along the stack direction of the unit electrodes, is defined such that a value obtained by dividing the thickness of the automobile cell by the sum of the thickness of the positive electrode active substance layer and the thickness of the negative electrode active substance layer is equal to or less than 80.

Other and further features, advantages, and benefits of the present invention will become more apparent from the following description taken in conjunction with the following drawings.

BRIEF DESCRIPTION OF THE DRAWINGS

FIG. 4A is a schematic cross sectional view typically representing the maximum cell thickness T1 and electrode terminal lead thickness T3, T3' of the automobile cell of the presently filed embodiment;

FIG. 4B is a schematic cross sectional view typically representing a thickness T2, T2' of electrode active substances of unit electrodes and electrode current collector total thickness T4, T4', shown in FIG. 4A, in a large scale;

FIG. 6A is a plan view of a battery of the presently filed embodiment;

FIG. 6B is a cross section taken on line C-C of FIG. 6A;

FIG. 6C is a cross section taken on line D-D of FIG. 6B;

FIG. 7 is a schematic perspective view illustrating a battery module of the presently filed embodiment;

DETAILED DESCRIPTION OF THE PREFERRED EMBODIMENT

Hereinafter, before entering into description of concrete several Examples and a Comparative Example according to the present invention, an automobile cell and its related method of an embodiment according to the present invention are described with suitable reference to the drawings.

First, a structure of the automobile cell of the presently filed embodiment is schematically described with reference to FIGS. 1 to 3. Further, the automobile cell of the presently filed embodiment is also called as a flat type cell or a flat type unit cell.

Figure 1:
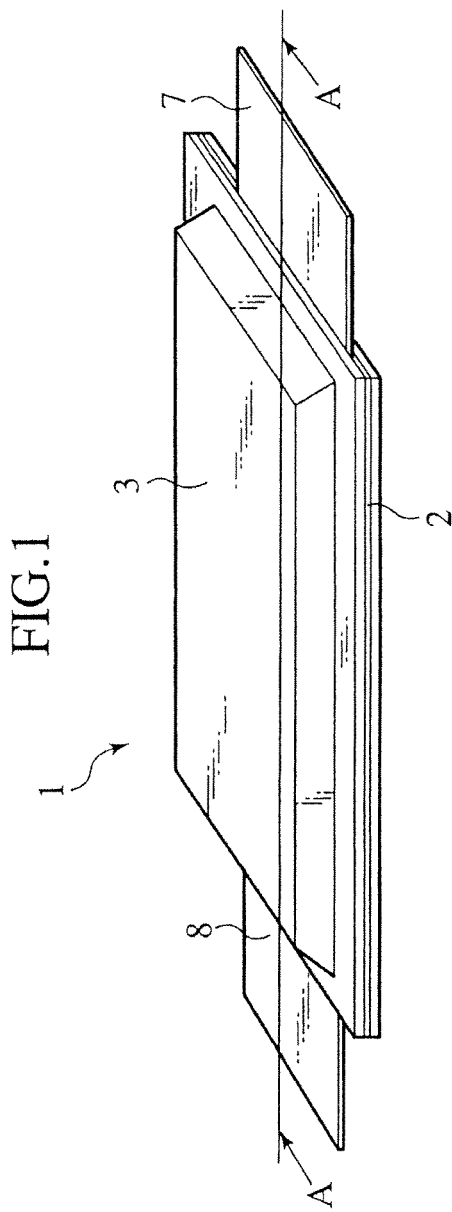
FIG. 1 is a perspective view typically representing an external structure of a stack type automobile cell of an embodiment according to the present invention.

FIG. 1 is a perspective view typically representing an externally appearing structure of a stack type automobile cell of the presently filed embodiment.

In FIG. 1, the automobile cell 1 of the presently filed embodiment includes cell outer sheath materials (also referred to as outer sheath laminate films or outer sheath laminates) 3, composed of a pair of opposing polymer and metal composite laminate films, (also referred to as laminate films compositely formed of polymer and metal, and also merely referred to as polymer-metal composite films or laminate films), which are thermally welded to one another so as to form thermally welded portions 2 at circumferentially entire peripheral portions of the outer heath materials, thereby gas-tightly sealing interiors of these component parts. A positive electrode terminal lead 7 and a negative electrode terminal lead 8 are taken out from the thermally welded portions 2 at opposing short sides of the cell outer sheath materials 3 of the cell 1, respectively. Of course, the positive electrode terminal lead 7 and the negative electrode terminal lead 8 may be of the type which are taken out from the thermally welded portions 2 at opposing long sides of the cell outer sheath materials 3 of the cell 1.

Figure 2:
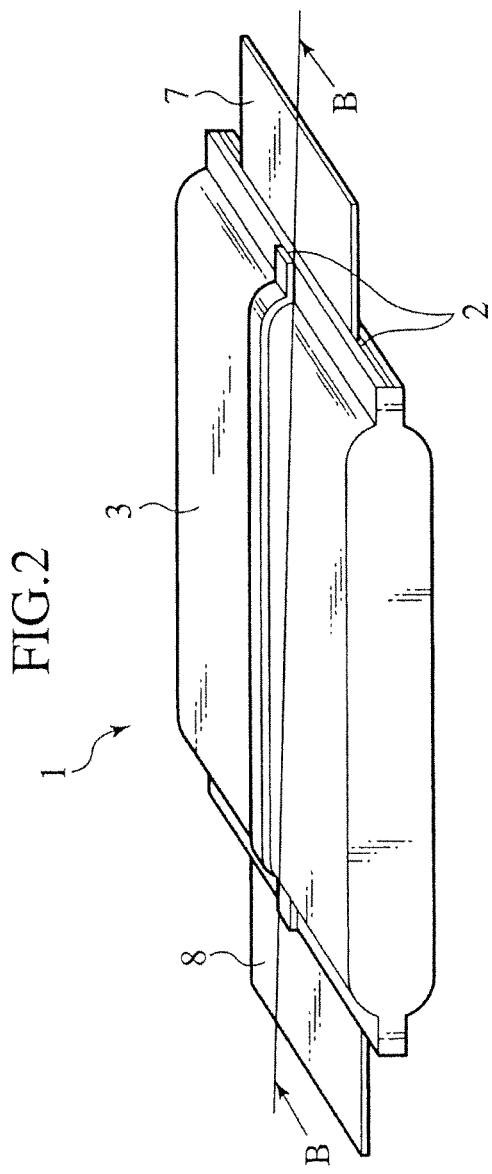
FIG. 2 is a perspective view typically representing another example of an external structure of a stack type automobile cell of the presently filed embodiment according to the present invention.

FIG. 2 is a perspective view typically representing an externally appearing structure of a stack type automobile cell of another example of the presently filed embodiment.

In FIG. 2, the automobile cell 1 is configured such that a single sheet of cell outer sheath material 3 is formed into an envelope shape formed with opening portions whose peripheral portions are thermally welded to form thermally welded portions 2 to hermetically seal an interior of the envelope shape. With such a structure, also, the positive electrode terminal lead 7 and the negative electrode terminal lead 8 are taken out from the thermally welded portions 2 at the opposing short sides of the cell outer sheath material 3 of the cell 1, respectively. Of course, the positive electrode terminal lead 7 and the negative electrode terminal lead 8 may be of the type which are taken out from the thermally welded portions 2 at the opposing long sides of the cell outer sheath material 3 of the cell 1. Further, in such a way, when rounding the cell outer sheath 3, composed of a single sheet of film, into a cylindrical shape to form an envelope configuration, both ends of the film are not thermally welded but may be overlapped and adhered.

Figure 3:
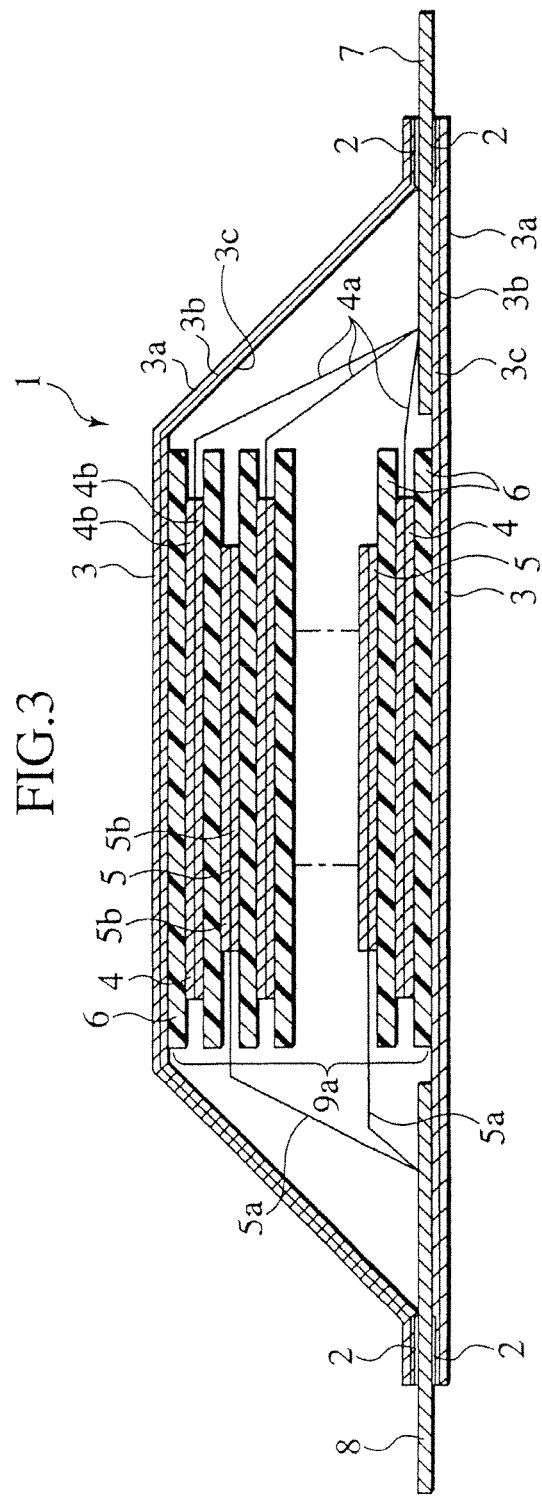
FIG. 3 is a cross sectional view typically representing a principal internal structure of the automobile cell of the presently filed embodiment and shows a cross section taken on line A-A of FIG. 1.

FIG. 3 is a cross sectional view that is a cross section taken on line A-A of FIG. 1 and typically and particularly represents an internal structure of the automobile cell of the presently filed embodiment. Further, the internal structure is also similar to that of cross section taken on line B-B of FIG. 2.

In FIG. 3, the cell outer sheath materials 3, formed of polymer-metal composite laminate films, are employed to allow entire peripheral portions thereof to be thermally welded to define an internal space, in which an electric power generating element (also referred to as stack electrodes) 9a, composed of positive electrode plates 4 and negative electrodes plates 5 stacked with respect to one another by means of separators 6, are sealed and gas-tightly accommodated. Further, the positive electrode terminal lead 7 electrically conductive with (electrically connected to) the positive electrode plates 4 is connected to positive electrode current collectors 4a, and a negative electrode terminal lead 8 electrically conductive with (electrically connected to) the negative electrode plate 5 is connected to negative electrode current collectors 5a. The positive electrode terminal lead 7 and the negative electrode terminal lead 8 are sandwiched between the associated thermally welded portions 2 and exposed to the outside of the cell outer sheath materials 3.

Here, the positive electrode refers to a structure that involves the positive electrode current collectors 4a having a positive electrode active substance and the positive electrode terminal lead 7 connected to a distal end of the positive electrode current collector 4a. Also, the positive electrode plate 4 refers to areas that are a part of the positive electrode current collector 4a and have reacting portions provided with positive electrode active substances (layers) 4b. Likewise, the negative electrode refers to a structure that involves the negative electrode current collector 5a having a negative electrode active substance and the negative electrode terminal lead 8 connected to a distal end of the negative electrode current collector. Also, the negative electrode plate 5 refers to areas that are a part of the negative electrode current collector 5a and have reacting portions provided with negative electrode active substances (layers) 5b. Thus, the electric power generating element is formed of the positive electrode plates 4, the separators 6 and the negative electrode plates 5. Also, either the positive electrode terminal lead 7 electrically conductive with the positive electrode plates 4 or the negative electrode terminal lead 8 electrically conductive with the negative electrode plates 5 form component elements of the flat type cell and, when occasion demands, may be regarded to be a part of the electric power generating element or may not be distinguished as the parts of the same with no particular limitation being intended.

The positive electrode plate 4 may preferably include a core plate (core foil), made from aluminum forming at least a portion of the positive electrode current collector 4a, whose both surfaces (if circumstances require, available in a single surface) are coated with the positive electrode active substance 4b that is dried to form the reacting portions of the positive electrode current collector 4a. Also, the negative electrode plate 5 may preferably include a core plate (core foil), made from copper forming at least a portion of the negative electrode current collector 5a, whose both surfaces (if circumstances require, available in a single surface) are coated with the negative electrode active substance 5b that is dried to form the reacting portions of the negative electrode current collector 5a.

More particularly, the positive electrode plate 4 is preferably formed in such a way that the both surfaces of the core plate (core foil) made of aluminum are coated with the positive electrode active substance 4b that includes a principal composition of the positive electrode active substance and polymer to absorb and retain an organic electrolyte solvent and is dried to allow such positive electrode substance 4b to be supported on the core plate (core foil). Also, the negative electrode plate 5 is preferably formed in such a way that the both surfaces of the core plate (core foil) made of copper are coated with the negative electrode active substance 5b that includes a principal composition of the negative electrode active substance and polymer to absorb and retain an organic electrolyte solvent and is dried to allow such negative electrode substance 5b to be supported on the core plate (core foil). Also, the core plates (core foils) made of aluminum or copper forming the respective reacting portions may be suitably constructed of lath plates, that is, plates formed with network spaces formed by cutting rifts in the plates which in turn are expanded, or merely a metal foil.

Further, the separator 6 may be preferably formed of a porous sheet (also referred to as a polymer electrolyte sheet made from polymer that absorbs and retains the organic electrolyte solvent.

Furthermore, an area between the reacting portion, of the positive electrode current collector 4a of the positive electrode plate 4, and the positive electrode terminal lead 7 serve as a positive-electrode-lead connecting portion. Also, an area between the reacting portion, of the negative electrode current collector 5a of the negative electrode plate 5, and the negative electrode terminal lead 8 serve as a negative-electrode lead connecting portion. The positive-electrode-lead connecting portion of the positive electrode current collector 4a and the negative-electrode lead connecting portion of the negative electrode current collector 5a are joined to the positive electrode terminal lead 7 and the negative electrode terminal lead 8 by ultrasonic welding, respectively. Of course, such joining may be carried out by resistance welding. Moreover, the positive-electrode-lead connecting portion of the positive electrode current collector 4a may be formed by using the positive electrode current collector 4a per se or may be formed of a separate member. Similarly, the negative-electrode-lead connecting portion of the negative electrode current collector 5a may be formed by using the negative electrode current collector 5a per se or may be formed of a separate member.

And, the positive electrode plates 4 and the negative electrode plates 5 are stacked in such a way that the negative electrode plate 5 is disposed to allow the negative electrode active substance 5b, existing on the upper side of the negative electrode plate 5, to oppose via the separator 6 to the downwardly facing positive electrode active substance 4b of the positive electrode plate 4 positioned above the negative electrode plate 5 while, similarly, the negative electrode active substance 5b formed on the bottom side of the negative electrode plate 5 is placed via the separator 6 in opposition to the upwardly facing positive electrode active substance 4b of another positive electrode plate 4 positioned below the negative electrode plate 5, and subsequently, the associated component parts are unitarily formed by thermal welding to form an electric power generating element.

Now, the relationship in terms of a thickness direction, the relationship in terms of a length, and the relationship in terms of a surface area of the automobile cell of the presently filed embodiment with such a structure mentioned above are described in conjunction with FIGS. 4A to 5.

FIG. 4A is a schematic cross sectional view typically illustrating thickness parameters, that is, the maximum cell thickness T1 and a lead thickness (positive electrode lead thickness) T3 of the electrode (at the positive electrode side) terminal 7, of various component parts of the automobile cell of the presently filed embodiment wherein because of the negative electrode terminal lead 8 being designed in the same structure, the relevant parameters bear the same indications as those of the positive electrode terminal lead with a symbol being added thereon (to allow the negative-electrode terminal lead thickness to be indicated by T3'). Also, FIG. 4B is a schematic cross sectional view to show a thickness (at one side) T2 of the positive electrode active substance of the unit electrode, a thickness (at one side) T2' of the negative electrode active substance of the unit electrode, an electrode (of the positive electrode side) current collector total thickness n×T4 (n: a number of the stacked positive electrode current collectors 4a, T4: a thickness of the positive electrode current collector 4a) and an electrode (of the negative electrode side) current collector total thickness m×T4' (m: a number of the stacked negative electrode current collectors 5a, T4': a thickness of the negative electrode current collector 5a), shown in FIG. 4A, in an enlarged scale. Additionally, in FIG. 4A, a Z-axis represents a vertical axis of the automobile cell and the thickness parameters of the various component parts of the automobile cell are expressed in a thickness along the Z-axis direction. Thus, a stack direction of the electric power generating element 9a with the positive electrode plates 4, the separators 6 and the negative electrode plates 5 being stacked is parallel to the Z-axis.

In FIGS. 4A and 5B, in the flat type cell 1, with a structure wherein the pair of laminate films mentioned above are used as the cell outer sheath materials 3 with the circumferentially peripheral portions being thermally welded or the single sheet of laminate film is formed in the envelope to allow the opening portions to be thermally welded to permit the electric power generating element 9a, composed of the stack of the positive electrode plates 4, the separators 6 and the negative electrode plates 5, to be encapsulated and sealed while the positive electrode terminal lead (and also the negative electrode terminal lead) is sandwiched between the thermally welded portions 2 so as to extend to the outside of the outer sheath materials 3, it is preferable that a value obtained by dividing the cell maximum thickness T1 (μm) by the active substance layer (μm), that is, a sum of T2 and T2', falls in a value equal to or less than 80 (as expressed by (T1/(T2+T2') ≤80).

Here, the cell maximum thickness means the thickness of the automobile cell that involves the electric power generating element, composed of the stack of the positive electrode plates, the separators and the negative electrode plates, and the polymer-metal composite laminate films encapsulating the electric power generating element. More particularly, as shown in FIG. 4A, the cell maximum thickness means a thickness T1 between the uppermost portion and the lowermost portion of the automobile cell 1 that involves the electric power generating element 9a, which is composed of the stack of the positive electrode plates 4, the separators 6 and the negative electrode plates 5, and the cell outer sheath materials 3 composed of the polymer-metal composite laminate films encapsulating the electric power generating element 9a, i.e., actually means a thickness between the uppermost portion and the lowermost portion of the cell outer sheath materials 3.

Further, the active substance thickness of the unit electrode means a thickness (at one side) of the active substance layer coated over the current collector. More particularly, as shown in FIG. 4B, in the unit electrode 9 composed of a pair of positive electrode plate 4 and negative electrode plate 5, the active substance thickness of the unit electrode means a total thickness between the thickness T2, of one of the positive electrode active substance layers 4b coated on both sides of the positive electrode current collector 4a of the positive electrode plate 4, and the thickness T2', of one of the negative electrode active substance layers 5b coated on both sides of the negative electrode current collector 5a of the negative electrode plate 5. Also, the active substance layer, which is referred to here, involves, in addition to the positive electrode active substance or the negative active substance, various additives such as electrically conductive agent and binder adhesives. More particularly, the active substance layer may include, in addition to the positive electrode substance, fluoride resin powder such as polyvinylidene fluoride (PVdF) or binders such as carboxymethyl cellulose, and an electrically conductive promoter such as acetylene black. Similarly, although the active substance layer may include, in addition to the negative electrode active substance, fluoride resin powder such as polyvinylidene fluoride (PVdF) or binders such as carboxymethyl cellulose, the present invention should not be limited to these substances.

With the structure set forth above, when repeatedly performing charging and discharging cycles of the battery at a high electric current as experienced for motor drives of EV, HEV and FCV, although a temperature rise occurs in the battery due to Joule's heat caused by internal resistance of the automobile cell, selecting the value, obtained by dividing the cell maximum thickness by the active substance thickness of the unit cell, so as to fall in a value equal to or less than 80 enables a heat dissipating property to be highly increased. As a result, even in the presence of repeated charging and discharging cycles at the large electric current, it becomes possible to restrict the temperature rise of the cell to a lower value.

Further, in the battery employing the polymer-metal composite laminate films as the cell outer sheath case, due to the laminate film having a less rigidity, although it is conceivable that the automobile cell tends to be readily deformed, when exerted with external forces, to cause the internal component parts to be adversely affected, selecting the value obtained by dividing the cell maximum thickness by the active substance thickness of the unit electrode to be equal to or less than 80 enables the rigidity of the cell to be improved, making it possible to fabricate a cell with internal component elements being protected from being adversely affected.

Furthermore, although in view of increasing the heat dissipating property, the present invention is not particularly limited to a particular value obtained by dividing the cell maximum thickness by the active substance thickness of the unit electrode provided that the value remains in a value equal to or less than 80, it is preferable for such a value to remain in a value equal to or greater than 10 and equal to or less than 80 in view of increasing the heat dissipating property without sacrificing a volumetric efficiency. By selecting the value obtained by dividing the cell maximum thickness by the active substance thickness of the unit electrode to fall in a value equal to or greater than 10, a ratio of materials, other than the active substance of the cell, such as the positive electrode current collector, the negative electrode current collector, the separator and the cell outer sheath materials made from laminate films increases to minimize deterioration in the volumetric efficiency, thereby enhancing an electric performance required for the automobile cell such as a motor drive power supply of EV, HEV and FCV.

Also, as the automobile cell having the relationship associated with such a thickness direction, no particular limitation is to be made and various other types of cells can be applied. Especially, in order to meet a particular application that needs a compact and light weight for ready installation onto EV, HEV and FCV and a high power output and high energy density, as required in a motor drive power supply, to allow a large electric current to be taken out from the cell, a lithium ion cell is suited and a detail thereof is described below.

Additionally, when taking such a lithium ion cell as an example, the thickness of the separator used for the automobile cell is preferred to be equal to or greater than 20 (μm) with a view to preventing the occurrence of micro short-circuiting caused by impurities contaminated during fabricating step or removal of the electrode active substance. Also, the thickness of the electrode current collector is preferred to be equal to or greater than 10 (μm) with a view to preventing the current collector foil from being torn during coating process of the active substance and preventing an increase in resistance. Moreover, the thickness (at one side) of the active substance layers is preferred to be equal to or greater than 20 (μm) due to restrictions caused by a coating apparatus to coat the active substance and a quality of a coated film. Thus, the active substance thickness, involving those of the positive electrode and the negative electrode, of the unit electrode is preferred to be equal to or greater than 40 (μm) (as expressed as $T2+T2' \geq 40$ (μm)).

In addition, it is preferred for the automobile cell of the presently filed embodiment to be configured such that a ratio ($T3/n \times T4$) between the thickness T3 of the positive electrode terminal lead 7 taken out from the outer sheath laminate film 3 and a total sum $n \times T4$ (where n is a number of the positive electrode current collectors) of the thickness T4 of the positive electrode current collectors 4a is equal to or greater than 0.4 and equal to or less than 2.0. Also, it is preferred that a ratio ($T3'/m \times T4'$) between the thickness T3' of the negative electrode terminal lead taken out from the outer sheath laminate film 3 and a total sum $m \times T4'$ (where m is a number of the negative electrode current collectors) of the thickness T4' of the negative electrode current collectors 5a is equal to or greater than 0.4 and equal to or less than 2.0.

Here, to explain an example with reference to FIG. 4B in connection with respective total thickness of the positive electrode current collector 4a and the negative electrode current collector 5a, when using an aluminum foil with the thickness T4 of 20 (μm) as the positive electrode current collector 4a, coating the positive electrode active substance over the current collector 4a to form the positive electrode plate 4 and stacking ten sheets (n=10) of positive electrode plates 4, the total thickness of the positive electrode current collectors 4a equals 200 (20×10) (μm). In this instance, if the positive electrode terminal lead 7 with the thickness T3 of 200 (μm) is employed, a ratio between the thickness T3 of the positive electrode terminal lead 7 and the total thickness $n \times T4$ of the positive electrode current collectors 4a equals 1.0 ($T3/n \times T4=1.0$). Similarly, when using a copper foil with the thickness T4' of 20 (μm) as the negative electrode current collector 5a and stacking eleven sheets (m=11) of the negative electrode plates whose current collectors 5a are coated with the negative electrode active substance, the total thickness of the negative electrode current collectors 5a equals 220 (20×11) (μm). In this instance, if the negative electrode terminal lead 8 with the thickness T3' of 200 (μm) is employed, a ratio between the thickness T3' of the positive electrode terminal lead 7 and the total thickness $m \times T4'$ of the negative electrode current collectors 5a equals 0.9 ($T3'/m \times T4'=0.9$).

With the structure set forth above, when repeatedly performing charging and discharging cycles of the battery at a high electric current as experienced for motor drives of EV, HEV and FCV, although there is a need for limiting a heat build-up in the electrode terminal lead, selecting the ratios between the electrode terminal lead thickness and the respective total thickness of the positive electrode current collectors and the negative electrode current collectors per se to fall in a value equal to or greater than 0.4 enables reduction in heat build-up in the electrode terminal lead appearing when repeatedly implementing the charging and discharging cycles at the large electric current, thereby providing a capability of performing the charging and discharging cycles at the large electric current.

Further, in the automobile cell for EV, HEV and FCV, although there is a need for enhancing a reliability in a sealing property, which would cause deterioration in the cell due to a poor gas-tightness, for a relatively long period, the presence of any of ratios between the electrode terminal lead thickness and the respective total thickness of the positive electrode current collectors and the negative electrode current collectors falling in a range equal to or less than 2.0 provides an improved sealing property of the electrode terminal lead sandwiched between the thermally welded portions and exposed to the outside of the outer sheath materials, thereby enhancing a long term reliability required for such automobile application.

Furthermore, in the automobile cell of the presently filed embodiment, it is preferred that each average thickness of the active substance layer 4b of the positive electrode plate 4 and the active substance layer 5b of the negative electrode plate 5 falls in a range equal to or greater than 20 (μm) and equal to or less than 80 (μm).

Here, the average thickness of the active substance layer 4b of the positive electrode plate 4 is assigned to be an average value in thickness of the positive electrode active substance layers 4b formed on all the positive electrode plates 4 employed in the electric power generating element 9a. The thickness of each positive electrode substance layer 4b is assigned to be the thickness T2 of one of the positive electrode substance layers 4b formed on the positive electrode current collectors 4a that have been described above with reference to FIG. 4B. Similarly, the average thickness of the active substance layer 5b of the negative electrode plate 5 is assigned to be an average value in thickness of the negative electrode active substance layers 5b formed on all the negative electrode plates 5 employed in the electric power generating element 9a. The thickness of each negative electrode substance layer 5b is assigned to be the thickness T2' of one of the negative electrode substance layers 5b formed on the negative electrode current collectors 5a that have been described above with reference to FIG. 4B.

With the structure set forth above, in an application where the high power output is required for driving a motor of EV, HEV and FCV with reduction in internal resistance being needed to allow a large current to be taken out, the presence of the average thickness of the active substance layers of the positive electrode and the negative electrode laying in a value equal to or greater than 20 (μm) increases a volume of the materials, other than the active substance of the cell, of the current collectors, the separators and the laminate films, thereby suppressing a reduction in the volumetric efficiency to the minimum. Moreover, the presence of the average thickness of the active substances of the positive electrode and the negative electrode falling in the value equal to or less than 80 (μm) restricts an increase in internal resistance to the minimum, providing a capability of enhancing an electric performance required for the applications where the high power output is required.

Figure 5:
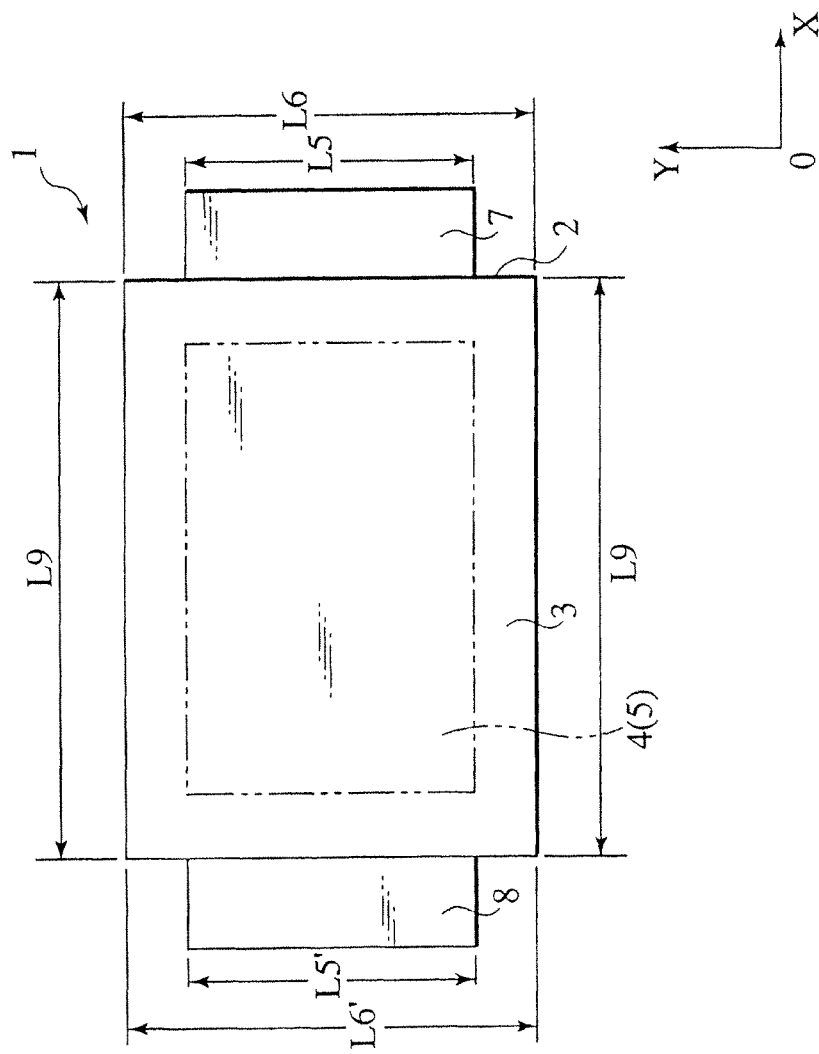
FIG. 5 is a schematic plan view typically illustrating electrode terminal lead width L5, L5', laminate width L6, L6', a unit cell surface area S7 and the maximum length L9 of the laminate film forming the automobile cell of the presently filed embodiment.

FIG. 5 is a schematic plan view typically illustrating widths L5, L5' of the electrode terminal leads, the laminate widths (a length of one side of the outer sheath laminate films from which the terminal leads are taken out) L6, L6', a unit cell surface area S7 and the maximum length L9 of one side, other than those of the cell outer sheath material from which the terminal leads are sandwiched between the thermally welded portions of the laminate films and exposed to the outside of the cell outer sheath material, of the automobile cell of the presently filed embodiment. In FIG. 5, also, the widths L5, L5' of the electrode terminal leads and the laminate widths L6, L6' exhibit lengths along the Y-direction, and the maximum length L9 of one side of the cell outer sheath material exhibits a length along the X-direction, with the X-, Y- and Z-directions, inclusive those of FIG. 4A, forming a three-axis orthogonal coordinate system.

In FIG. 5, in a flat type cell employing the polymer-metal composite laminate film as the cell outer sheath material 3, the electrode terminals leads 7, 8, electrically conductive with respective electrodes forming the electric power generating element of the cell may preferably have a value, obtained by dividing the unit cell surface area S7 (cm$^2$) by a cell capacity CB (Ah), falling in a range equal to or greater than 30 (cm$^2$/Ah) (S7/CB≥30) whereas the maximum length L9 of one side, other than those of the cell outer sheath material from which the terminal leads are sandwiched between the thermally welded portions of the laminate films and exposed to the outside of the cell outer sheath material 3 lies in a value equal to or less than 250 (mm).

Here, the length L9 of the sides, other than those of the cell outer sheath material from which the terminal leads are sandwiched between the thermally welded portions of the laminate films and exposed to the outside of the cell outer sheath material, is assigned to be the length L9 of two sides other than those from which as the electrode terminal leads, the two sheets of leads 7, 8 for the positive electrode and the negative electrode are taken out at two different sides (in length L6, L6': in general L6=L6'), that is, from which two sheets of leads 7, 8 for the positive electrode and the negative electrode are normally taken out as the electrode terminal leads. Also, in general, such two sides are equal to one another and indicated in length as L9.

Further, the unit cell surface area S7 means a surface area S7 that is a surface area, projected in the Z-direction, per one layer of the positive electrode plate 4 or the negative electrode plate 5 accommodated inside the cell outer sheath material 3 composed of the polymer-metal composite laminate films. Also, in a case where the surface areas per one layer of the positive electrode plate 4 and the negative electrode plate 5 are different from one another, among these, a wider surface area is adopted.

Furthermore, the cell capacity (Ah) means an electrical quantity in which the automobile cell is able to take out an electric current at a rate of 1 CA related to so-called 1C.

With the structure set forth above, when performing charging and discharging cycles at the large electric current as experienced when driving the motor of EV, HEV and FCV, there is a need for decreasing internal resistance of the battery as low as possible to suppress the heat build-up. In this case, if the maximum length of one side other than those which are sandwiched between the thermally welded portions of the outer sheath laminate films and exposed to the outside of the outer sheath materials exceeds 250 (mm), a distance between the electrode terminal lead, from which the electric current is taken out, and the remotest associated electrode increases and, hence, internal resistance increases to cause the heat build-up in the electrode terminal lead to increase when in operation to take out the large electric current. Therefore, by selecting the maximum length of one side other than those which are sandwiched between the thermally welded portions of the outer sheath laminate films and exposed to the outside of the outer sheath materials to be equal to or less than 250 (mm), it is possible to reduce internal resistance between the remotest area of the electrode terminal lead of the electrode and the opposing end of the electrode terminal lead, thereby enabling an electric performance required for the automobile to be enhanced. Also, the lower limit of the maximum length of such one side is deemed to be estimated to fall in a value of approximately 50 (mm) in consideration of a materializing property of the battery.

Further, the presence of the value, resulted by dividing the unit cell surface area by the cell capacity, falling in a value equal to or greater than 30 (cm$^2$/Ah) during charging and discharging cycles at the large electric current as experienced in the motor drive for EV, HEV and FCV, enables an increase in the heat dissipating surface area (heat exchange surface area) of the cell, resulting in an improvement over a life cycle characteristic that is excellent in a heat dissipating property to enable production of the cell having an excellent reliability.

Moreover, since a high power output and high energy density is required in the motor drive battery for use in EV, HEV and FCV, normally, no probability exists wherein a single automobile cell (unit cell) is in use and the automobile cell presupposes a use wherein a plurality of unit cells are connected in series and/or parallel to form a battery. For this reason, the automobile cell per se for use as the battery has a battery capacity of approximately 1.5 to 6 (Ah).

Further, in the automobile cell of the presently filed embodiment, it is preferable for each electrode terminal lead to be taken out from one side of the laminate film such that the width L5 of the positive electrode terminal lead 7, which is taken out from the outer sheath laminate film 3, lies in a range equal to or greater than 40(%) and equal to or less than 80(%) of the length L6 of the side of the outer sheath laminate film from which the positive electrode terminal lead is taken out and the width L5' of the negative electrode terminal lead 8, which is taken out from one side of the outer sheath laminate film 3, lies in a range equal to or greater than 40(%) and equal to or less than 80(%) of the length L6' of the side of the outer sheath laminate film from which the negative electrode terminal lead is taken out. The presence of the value equal to or greater than 40(%) suppresses the heat build-up in the electrode terminal lead during the charging and discharging cycles to enable charging and discharging at the large electric current, and the presence of the value equal to or less than 80(%) enables a sealing property to be ensured for the reasons which will be discussed below in detail.

If the electrode terminal leads 7, 8 with both widths of 30 (mm) are employed and both the laminate film widths L6, L6', from which the electrode terminal leads 7, 8 are taken out, fall in 50 (mm), the widths L5, L5' of the respective electrode terminal leads taken out from the outer sheath laminate film 3 are equal to 60(%) of the length of the side of the outer sheath laminate film from which the electrode terminal leads are taken out.

With the structure mentioned above, since the high power output and high energy density is required in the motor drive battery for use in EV, HEV and FCV, normally, no probability exists wherein the single automobile cell (unit cell) is in use and the automobile cell is used under a condition where a plurality of unit cells are connected in series and/or parallel to form a battery. In such a case, by allowing the electrode terminal leads to be taken out from the respectively associated sides of the outer sheath laminate film under a condition where the width of the electrode terminal lead, which is taken out from the outer sheath laminate film, falls in a range equal to or greater than 40(%) and equal to or less than 80(%) of the length of the relevant side of the outer sheath laminate film from which the electrode terminal lead is taken out, adequate welding surfaces can be ensured when connecting these unit cells to form the battery and it becomes possible to use a technique such as an ultrasonic welding. This results in a capability of providing connection between the unit cells in a relatively simplified manner with no need for using bolts, thereby decreasing resistance of the whole battery to enable a light weight in structure.

Further, in the automobile cell of the presently filed embodiment, it is preferable for the respective electrode terminal leads of the positive electrode and the negative electrode to be made of materials selected from Ni, Cu, Al, Fe, and an alloy of these metals or compositions made from Ni, Cu, Al, Fe or alloy of these metals which are coated with differing elements among Ni, Ag and Au.

With the structure described above, there is a need for suppressing the heat build-up in the electrode terminal leads when in repeated cycles of charging and discharging at a large electric current as experienced when driving the motor for EV, HEV and FCV. In this case, the use of the electrode terminal leads, made from the compositions selected from Ni, Cu, Al, Fe and an alloy of these metals or the compositions made from Ni, Cu, Al, Fe and alloy of these metals which are coated with differing elements among Ni, Ag and Au, enables the heat build-up to be suppressed for suppressing heat degradation of the electrode terminal lead portion that is sandwiched between the thermally welded portions to be exposed to the outside of the outer sheath, thereby enabling a prolonged reliability required for the automobile cell. Moreover, in view of low costs, such a coating material may preferably include Ni and, although a coating method may preferably include a metal plating method, it may be possible to use a metallic stack body such as a clad material.

Meanwhile, the electrode of the presently filed embodiment of the automobile cell constructed in such a structure may include a positive electrode that allows a lithium ion to be occluded or eliminated and a negative electrode that allows the lithium ion to be occluded or eliminated. Moreover, in such a case, as the electric power generating element except for the electrodes, it is possible to employ a separator and electrolyte solvent soaked into the same, or a solid electrolyte or gel electrolyte, or a supporting substrate and a solid electrolyte or a gel electrolyte supported thereon.

The lithium ion cell (typically, a solid electrolyte cell or a gel electrolyte cell), employing the electric power generating element formed in such a structure, may take a form of a flat type cell structure previously mentioned above. This is because of the fact that in a case where a cylindrical type cell structure is employed, sealing properties of the areas, from which the positive electrode terminal lead and the negative electrode terminal lead are taken out, have certain limitations and, in the cell with the high energy density and high power output to be installed on an electric vehicle and a hybrid automobile, specifically, certain limitations are encountered in a long-term reliability of the sealing properties of the areas from which the electrode terminal leads are taken out.

Furthermore, although the electric power generating element may preferably include the positive electrode, made from a principal material involving $LiCoO_2$, $LiMn_2O_4$ or $LiNiO_2$, and the negative electrode involving the negative electrode active substance 5b made from principal material involving graphite or hard carbon formed of amorphous carbon, the present invention is not particularly limited thereto. Also, the respective active substance layers 4b, 5b, involving the positive electrode active substance or the negative electrode active substance which are referred to here, may include, in addition to the positive electrode active substance or the negative electrode active substance, additives such as an electrically conductive agent and binders. More particularly, although no limitation is intended, in addition to the positive electrode active substance, the active substance layer may include fluoride resin powder, such as polyvinylidene fluoride (PVdF), or binder such as carboxymethyl cellulose, and electrically conductive agent such as acetylene black. Similarly, though not intended to be limited, in addition to the negative electrode active substance, fluoride resin powder, such as polyvinylidene fluoride (PVdF) or binder such as carboxymethyl cellulose may be included.

Furthermore, the separator 6 for use in such a structure should not be limited to a particular element and is not intended to be tied to such a designation and may use a solid electrolyte and gel-shaped electrolyte of the type that has a function of (plays a role as) a separator in place of a simple separator. That is, by accommodating an electric power generating element, constructed of the solid electrolyte or the gel-shaped electrolyte that is disposed between the positive electrode active substance (layer) of the positive electrode plate and the negative electrode active substance (layer) of the negative electrode plate, in the outer sheath material composed of the laminate films and thermally welding the circumferential peripheries of the laminate films to hermetically seal the electric power generating element, a lithium ion cell (a solid electrolyte cell or a gel electrolyte cell) is formed. Moreover, of course, as set forth above, the electric power generating element may include the separator and the electrolyte soaked in the same, in pace of the solid electrolyte and the gel electrolyte serving as the separator and, in a case where an adequate strength is not expected in the solid electrolyte and the gel-shaped electrolyte, the supporting substrate may be used in combination with those elements.

Moreover, the polymer-metal composite laminate film 3, serving as the cell outer sheath material to be available for use in such a structure, is not intended to be particularly limited and may use a unitary structure wherein a metallic film is interposed between the polymer films with whole component parts being stacked. In particular, the laminate film 3 is formed by placing an outer sheath protecting layer (the outermost laminate layer) 3a composed of the polymer film, a metallic film layer 3b and a thermally welding layer (the innermost laminate layer) 3c composed of the polymer film, a whole of which is stacked in a unitary configuration. More particularly, the polymer-metal composite laminate film 3 for use in the cell outer sheath may employ a structure wherein both surfaces of the metallic film 3b are initially formed with a heat-resistant insulation film 3a, composed of the polymer film, and then a stack film 3c composed of the heat-resistant insulation film whose at least one surface is laminated with a thermally welding insulation film composed of the polymer film, and a structure wherein one surface of the metallic film 3b is formed with the heat-resistant insulation film 3a, composed of the polymer film, and then another surface of the metallic film 3b is formed with the thermally welding insulation film 3c composed of the polymer film. By thermally welding such a laminate film 3 by a suitable method, partial areas of the thermally welding insulation film of the thermally welding layer 3c are thermally welded to be joined, thereby forming the thermally welded portions 2.

Additionally, though not to be limited, the metallic film 3b forming such a laminate film 3 may preferably include an aluminum film. Also, as the resin films 3a, 3c, though not to be limited, a polytetraphthalate film (heat-resistant insulation film), a nylon film (heat-resistant insulation film), a polyethylene film (heat-resistant insulation film) and a polypropylene film (heat-resistant insulation film) may be preferably used.

And, upon using such a laminate film 3, utilizing the thermally welding insulation film 3c enables a pair of laminate films or one sheet (in the envelope shape) of the laminate film to be joined by thermally welding such as ultrasonic welding in an easy and reliable fashion. Also, in order for the long-term reliability of the battery to be increased to the maximum, the metallic films 3b, 3b, forming the component parts of the laminate film, to be directly joined with respect to one another. In order to join the metallic films 3b, 3b with respect to one another while removing or destroying the thermally welding resin intervening between the metallic films, the ultrasonic welding may be employed.

Moreover, while the automobile cell of the presently filed embodiment has been described in conjunction with an example of the lithium ion cell represented by the solid electrolyte cell or the gel electrolyte cell, the present invention is not limited thereto and, of course, may also be applied to a variety of cells.

Next, the automobile cells with the structure set forth above may be combined in a variety of forms, providing a capability of constructing an automobile battery which will be described below.

First, the automobile battery of the presently filed embodiment may be preferably comprised of at least more than one group that includes at least more than two automobile cells 1, with the structure mentioned above, which are connected in parallel or series to allow the cells 1 to be stacked or placed side by side so as to permit the associated electrode terminal leads 7, 7 of the batteries which are stacked or placed side by side, the associated electrode terminal leads 8, 8 or the associated electrode terminal leads 7, 8 to be mutually welded to one another.

Here, FIG. 6A is a plan view of the battery 10 of the presently filed embodiment, FIG. 6B is a cross sectional view taken on line C-C of FIG. 6A and FIG. 6C is a cross sectional view taken on line D-D of FIG. 6B.

As shown in FIGS. 6A to 6C, four sheets of flat type automobile cells (unit cells) 1 are connected in parallel and six sheets of four parallel-connected cells 1 are connected in series and accommodated in the battery case 11 made from metal, thereby forming the battery 10. Also, a positive electrode terminal 12 and a negative electrode terminal 13 of the battery 10 provided on a lid member 11a located above the battery case 11 are electrically connected to the electrode terminal leads 7, 8 via positive electrode and negative electrode lead sires 14, 15 of the battery 10. Moreover, when connecting four sheets of the automobile cells 1 in parallel, suitable connecting members such as spacers 16 are is used to allow the electrode terminal leads 7 of the respective automobile cells 1 to be mutually welded to one another for thereby electrically connecting the electrode terminals 7 to one another. Similarly, when further connecting the six sheets of the four parallel-connected automobile cells 1, using bus bars 17 as connecting members to permit the electrode terminal leads 7, 8 of the respective automobile cells 1 to be mutually welded allows the electrode terminal leads 7, 8 to be electrically connected to one another. Also, such battery 10 may be provided with a variety of measuring equipments and control equipments, and a voltage measuring connector 18 may be located on the lid member of the battery case 11 for monitoring a battery voltage. Moreover, various connector members are not restrictive, and the lead wires 14, 15 for the positive and negative electrode terminals may be replaced with bus bars, respectively, while the spacers 16 are omitted to allow the electrode terminal leads 7 not to be indirectly connected but to be directly welded. Moreover, it is not objectionable to use other connecting members such as lead wires in pace of the bus bars 17 provided that such connecting members are able to flow a large electric current in compliance with the high power output and high energy density.

Here, stacking the cells 1 means that, as shown in FIG. 6C, flattened flat surfaces of the flat type automobile cells (unit cells) 1 are opposed to one another to allow the respective cells 1 to be sequentially stacked in a direction perpendicular to such surface.

Of course, as shown in FIG. 6B, stacking the cells 1 may mean that the flattened flat surfaces of the flat type automobile cells (unit cells) 1 are opposed to one another to allow the respective cells 1 to be sequentially stacked in a direction parallel to such surface and, in such a case, in other words, it may be expressed that the cells 1 are placed side by side.

Here, placing the cells 1 side by side means that, as shown in FIG. 6B, the flat type automobile cells 1 are put in order in right and left positions so as to allow adjacent sides, other than those from which the terminal leads 7, 8 of the cells 1 are taken out, of the respective cells 1 to be mutually adjacent to one another.

Additionally, these stack structure and the side-by-side structure are combined as the battery 10, as shown in FIGS. 6A to 6C, in which the cells 1 may be stacked in the direction perpendicular to the surface of the battery or stacked (placed side by side) in the direction parallel to the surface of the battery.

With the structure set forth above, since the motor drive battery for EV, HEV and FCV is required to have a high power output and high energy density, normally, no probability of using a single cell exists and a plurality of automobile cells (unit cells) are connected in series or parallel to form a battery for usage. In this case, the presence of parallel or series connected patterns, when combining the automobile cells to form the battery for usage, taking the form of configurations wherein the cells 1 are stacked in an overlapped state or placed side by side so as to allow the electrode terminal leads, which are stacked or placed side by side, to mutually comply with and welded to one another enables the following advantageous effects to be provided.

By permitting the electrode terminal leads, which are stacked or placed side by side, to be mutually welded to one another through the use of the technique such as the ultrasonic welding, it is possible to provide connection between the cells in a relatively easy fashion with no use of bolts, thereby enabling an enhancement of an adequate welding surface area. For this reason, resistance of the whole battery can be reduced, enabling a light weight to be obtained. As a result, when installing such a battery in EV, HEV and FCV as the motor drive power supply thereof, it becomes possible to comply with demands for battery capacities or power outputs each for using purposes at a relatively low cost without newly developing, designing and manufacturing the battery using the unit cells different in battery capacities and power outputs.

That is, by mass producing one or more than one kind of automobile cells, which have excellent heat dissipating properties to suppress the increase in the cell temperature to have favorable sealing properties, as unit cells to be shared (for common use) and fabricating a battery with light weight and compact in structure depending on the battery capacity and the power output, it is possible to produce the batteries different in battery capacity and the power output at a relatively low cost. For this reason, such a battery can be widely applied to the motor drive battery for EV, HEV and FCV where the high power output and high energy density are required.

Also, while the present invention has been described with reference to an example wherein the ultrasonic welding is used as the method of indirectly or directly welding the stacked or side-by-side positioned electrode terminal leads with respect to one another, the present invention is not limited thereto and it is possible to utilize various welding techniques such as a resistance welding and a spot welding. Preferably, it is desirable to use ultrasonic welding that has a less probability of heat build-up and a low thermal load to be exerted to the thermally welded portions of the cell outer sheaths at the areas wherein the electrode terminal leads are sandwiched between the thermally welded portions and exposed to the outside of the cell outer sheaths.

Further, such a battery may be comprised of more than one group that is constructed of at least more than two automobile cells connected in parallel or series. Namely, as occasion demands when producing batteries differing in the battery capacity and power output, the battery may be comprised of a group of at least more than two automobile cells connected in series, a group of automobile cells connected in parallel and a group of automobile cells connected in series and parallel. In addition, the battery may be presented in at least two groups constructed of a group including a single cell connected to the series-connected cells, a group composed of the cells connected in parallel and a group composed of the cells connected in series and parallel. In the presence of such plural groups of cells, the positive electrode terminal and the negative electrode terminal may be provided for each group forming the battery to allow each group of cells to provide a desired battery capacity and power output to suit for a variety of applications for thereby enabling a single cell to be utilized in multipurpose applications and, thus, the present invention may not be limited to a particular degree of freedom.

Furthermore, the automobile cell of the presently filed embodiment may be arranged in such a structure that when locating the cells 1 in a stacked or side-by-side state to provide at least more than one group in which the cells 1 are connected in parallel or series, one or plural electrode terminal leads of the cells stacked or placed side by side are welded to a single sheet of associated bus bar.

In such a structure, although an arrangement is involved wherein one or plural electrode terminal leads are defined to be welded to a single sheet of associated bus bar and not only the plural electrode terminal leads 7, 8 but also either one of the electrode terminal leads 7 or 8 are welded to the single sheet of bus bar 17, this is because of the fact that when connecting the remotest terminal end portion among the terminal leads 7, 8 of the automobile cell 1 to the electrode terminals 12, 13 of the battery 10, it is provable for such a connecting form to be realized.

Next, upon a variety of combinations of the automobile cells in the structure mentioned above, the following automobile battery module may be possibly constructed.

The automobile battery module of the presently filed embodiment may be comprised of a battery module that include at least more than two automobile cells, of the structures set forth above, which are connected in series, parallel or in combination of series and parallel connections.

FIG. 7 is a schematic perspective view illustrating the battery module of the presently filed embodiment.

As shown in FIG. 7, the battery module may exemplarily take the form of a structure wherein six sets of battery 10 are connected in parallel to form a battery module 21. In particular, in order for the six sets of battery 10 to be connected in parallel, the positive electrode terminals 12 and the negative electrode terminals 13 of the battery 10 disposed above the lid members 11a of the respective battery cases 11 are electrically connected, respectively, using a battery positive-electrode terminal connecting plate 24 having an external positive-electrode terminal portions 22 and a battery negative-electrode terminal connecting plate 25 having an external negative-electrode terminal portions 23. Then, connecting plates 26, each having openings 26a associated with corresponding threaded bores, are fixed to the respective threaded bores (not shown) formed at both sides of the respective battery cases 11 by use of fastening threads 27, thereby connecting the battery 10 with respect to one another. Also, the positive terminals 12 and the negative terminals 13 of the respective battery 10 are protected by a positive electrode insulation cover 28 and a negative electrode insulation cover 29, respectively, which are discriminated from one another through suitable colorings, such as a color cording in red and blue.

With the structure set forth above, connecting at least more than two battery 10 in series, parallel or in combination of series and parallel allows the structure to comply with a demand for a particular battery capacity and power output for each application purpose, where the batteries are installed in the electric automobile and hybrid car at a relatively low cost without newly manufacturing batteries.

Next, the automobile cells and the battery modules of the structures set forth above may be installed on a vehicle in a variety of combinations.

Figure 8:
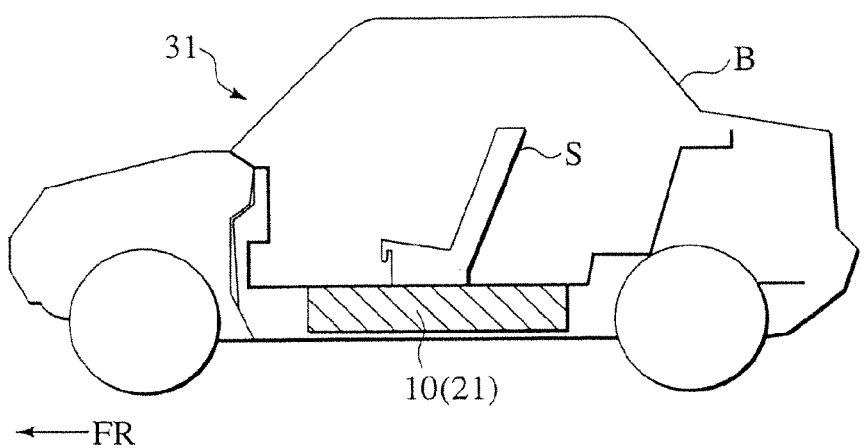
FIG. 8 is a schematic view typically representing a vehicle that is installed with the battery and the battery module of the presently filed embodiment.

FIG. 8 is a schematic view typically representing a vehicle in which the batteries and the battery modules of the presently filed embodiment are installed.

As shown in FIG. 8, it is convenient for the battery 10 and the battery module 21 to be installed in a space beneath seats S at a center of a vehicle body B of EV, HEV or FCV 31 because a vehicle compartment and trunk room can be widely taken. However, this is not limitative, and the batteries may be installed in an area beneath a rear trunk room, or if an engine is not installed in a front area of the vehicle body like in EV and FCV, the batteries may be installed in the front area of the vehicle body where the engine would be installed.

Also, the battery 10 and the battery module 21 may be installed in combination.

Further, although the vehicle that can be installed with such a battery and a battery module preferably includes EV, HEV and FCV, the present invention is not limited to such applications.

With the structure mentioned above, installing the battery and the battery module enables fabrication of a battery having a large energy density and a high power output at a relatively low cost, thereby making it possible to provide EV, HEV and FCV which has an increased cruising range and an improved fuel consumption.

Further, installing the battery and the battery module on the vehicle such as EV, HEV and FCV enables suppression of the heat build-up in the electrode terminal leads caused during the discharging cycle at the large electric current when in an installed state, improving a life cycle characteristic while, additionally, enhancing a favorable sealing property for a relatively extended period of time.

Furthermore, the automobile cell of the presently filed embodiment is not to be limited to the stack type flat battery which has been set forth above and may be used in other kinds such as in a wound type flat cell, which may not be objectionable to be applied to the battery and the battery module.

Figure 9:
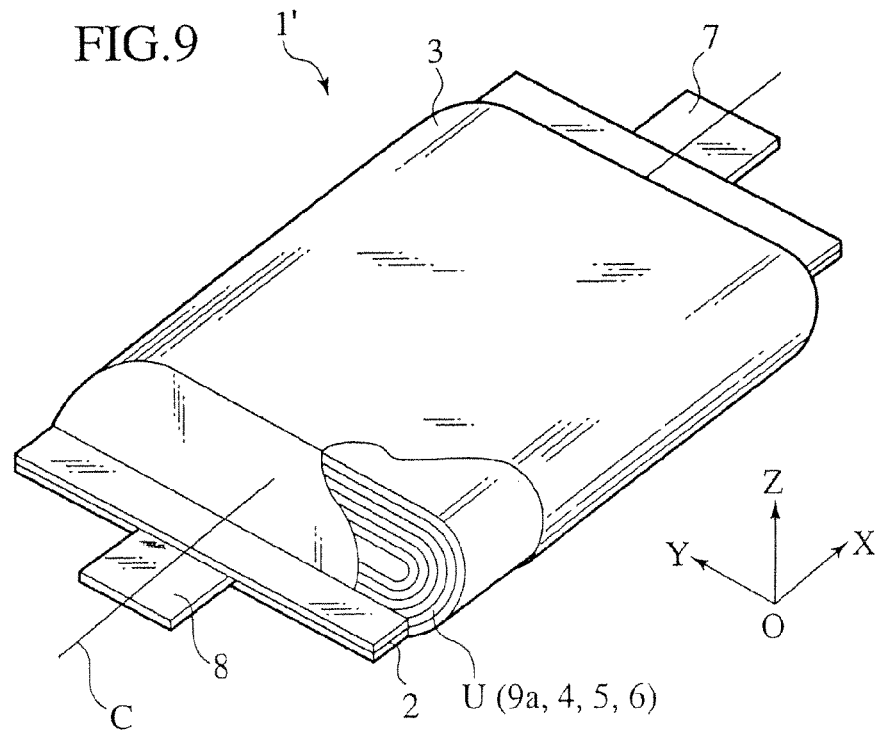
FIG. 9 is a perspective view typically representing an external structure of a wound type automobile cell of the presently filed embodiment according to the present invention.

FIG. 9 is a perspective view typically representing an external structure of a wound type automobile cell of the presently filed embodiment.

As shown in FIG. 9, a wound type automobile cell 1' is identical to that of the stack type structure mentioned above and is similar to those of FIGS. 3 to 5 in cross sectional structure and upper structure except that the electric power generating element 9a is configured in a structure wherein a sheet-like stack body U, in which the positive electrode 4, the separator 6 and the negative electrode plate 5 are stacked, is wound about a winding axis C.

More specifically, while the wound type automobile cell of the present filed embodiment is defined to have the same dimensional features as that of the stack type battery in thickness T1 to T4', length L5 to L9 and surface area S7 shown in FIGS. 3 to 5, to supplement description, the battery has the same unit cell surface area S7 as that of the surface area which is projected in the Z-direction on the XYZ coordinate system of FIG. 9 and, more specifically, the unit cell surface area S7 includes a surface area (a wide surface area at the outermost contour) of the electrode prevailing at the outermost circumferential periphery of the stack body U (forming the electric power generating element 9a).

Now, more concrete several Examples and a Comparative Example of the presently filed embodiment according to the present invention are described below.

EXAMPLE 1

In this Example 1, as shown in FIGS. 1 to 5, a flat type cell of a stack structure was fabricated in a structure wherein the circumferentially peripheral portions of the cell outer sheath material 3 made of polymer-metal composite laminate film with a thickness of 120 (μm) were joined by thermal welding and the positive electrode terminal lead 7 and the negative electrode terminal lead 8 with respective thickness of 100 (μm) and width 80 (μm) are taken out from two points, i.e., from the opposing sides of the thermally welded portions 2.

In particular, use was made for the positive electrode plate 4 having the positive electrode current collector 4a, made of aluminum foil that has a thickness of 15 (μm) and coated with a slurry including the positive electrode active substance of $LiMn_2O_4$ and, in addition thereto, a mixture of PVdF, serving as the binder, and acetylene black serving as the electrically conductive promoting agent and dried to form the positive electrode active substance layers 4b on both sides thereof with each side in a thickness of 60 (μm) whereupon the same was cut in a rectangular shape of a surface area of 300 ($cm^2$). The negative electrode plate 5 was used in a structure wherein the negative electrode current collector 5a, made of copper foil with a thickness of 15 (μm), was coated with a slurry including a mixture of the negative electrode active substance of amorphous carbon, which was able to occlude and eliminate lithium ions, and PVdF serving as the binder and dried to form the negative electrode active substance layers 5b on both sides thereof with each side in a thickness of 60 (μm) whereupon the same was cut in a rectangular shape of a surface area of 300 ($cm^2$). The separator 6 with a thickness of 25 (μm) made from polypropylene was used. The electrolyte composed of solvent containing PC-DMC mixed at a molar ratio of 1:1 dissolved with 1 (mol/L) of $LiPF_6$ was used.

Preparing six sheets of negative electrode plates 5 and five sheets of positive electrode plates 4, the separator 6 was sandwiched and stacked in sequence between the negative electrode plate 5b and the positive electrode plate 4a, forming the electric power generating element 9a, to which the positive electrode terminal lead 7 and the negative electrode terminal lead 8 having the thickness T3, T3' of 100 (μm) and the widths L5, L5' of 80 (mm) were connected. The resulting electric power generating element 9a was then encapsulated in the outer sheath laminate films 3 whereupon the circumferentially peripheral portions of the cell outer sheath materials 3 were thermally welded to hermetically seal the electric power generating element 9a, thereby fabricating a flat automobile cell of a stack type. Also, the electrolyte was pored into the interior of the battery using an injector.

With such a structure, a value obtained by dividing the maximum cell thickness T1 by the active substance thickness T2+T2' of the unit electrode was 15, and a value obtained by dividing the unit cell surface area S7 by the cell capacity CB was 176 ($cm^2$/Ah). The cell had a size of L6 (=L6')×L9× T1=170 (mm)×200 (mm)×1800 (μm) (subsequently, the cell size will be similarly described). Specifications of the automobile cell of this Example were indicated in Tables 1, 2 listed below. Also, the cell capacity was obtained by a product of discharging current×discharging time occurring when discharging the cell at a rate of 1 CA of a designed capacity in a range from 4.2 to 2.5 (V) (to be similarly executed in subsequent processes).

EXAMPLE 2

Using the same electrodes as those of Example 1 in the present Example 2, the separators 6 were sequentially sandwiched and stacked between eleven sheets of negative electrode plates 5 and ten sheets of positive electrode plates 4, forming the electric power generating element 9a, to which the positive and negative electrode terminal leads 7, 8 having the thickness T3, T3' of 200 (μm) and the widths L5, L5' of 80 (mm) were connected. The resulting electric power generating element 9a was then encapsulated in the outer sheath laminate films 3 whereupon the circumferentially peripheral portions of the cell outer sheath materials 3 were thermally welded, thereby fabricating a flat automobile cell of a stack type.

A value of the maximum cell thickness T1/the active substance thickness T2+T2' of the unit electrode was 29, and a value of the unit cell surface area S7/the cell capacity CB was 79 ($cm^2$/Ah). Also, the cell size was L6 (=L6')×L9×T1=170 (mm)×200 (mm)×3500 (μm). Specifications of the automobile cell of this Example were indicated in Tables 1, 2 listed below.

EXAMPLE 3

Using the same electrodes as those of Example 1 in the present Example 3, the separators 6 were sequentially sandwiched and stacked between sixteen sheets of negative electrode plates and fifteen sheets of positive electrode plates, forming the electric power generating element 9a, to which the positive and negative electrode terminal leads 7, 8 with the thickness T3, T3' of 200 (μm) and the widths L5, L5' of 80 (mm) were connected. The resulting electric power generating element 9a was then encapsulated in the outer sheath laminate films 3 whereupon the circumferentially peripheral portions of the cell outer sheath materials 3 were thermally welded, thereby fabricating a flat automobile cell of a stack type.

A value of the maximum cell thickness T1/the active substance thickness T2+T2' of the unit electrode was 43, and a value of the unit cell surface area S7/the cell capacity CB was 50 ($cm^2$/Ah). The cell size was L6 (=L6')×L9×T1=170

(mm)×200 (mm)×5100 (μm). Specifications of the automobile cell of this Example were also indicated in Tables 1, 2 listed below.

EXAMPLE 4

In this Example 4, using the same electrodes as those of Example 1 except for that the negative electrode plate 5 and the positive electrode plate 4 had the respective active substance layers 5b, 4b each at one side thereof with the thickness T2', T2 of 30 (μm), the separators 6 were sequentially sandwiched and stacked between sixteen sheets of negative electrode plates 5 and fifteen sheets of positive electrode plates 4 to form the electric power generating element 9a, to which the positive and negative electrode terminal leads 7, 8 with the thickness T3, T3' of 200 (μm) and the widths L5, L5' of 80 (mm) were connected, which was then encapsulated in the outer sheath laminate films 3 whereupon the circumferentially peripheral portions of the cell outer sheath materials 3 were thermally welded and the same operations as those of Example 1 were carried out, thereby fabricating a flat automobile cell of a stack type.

A value of the maximum cell thickness T1/the active substance thickness T2+T2' of the unit electrode was 55, and a value of the unit cell surface area S7/the cell capacity CB was 100 (cm$^2$/Ah). Also, the cell size was L6 (=L6')×L9×T1=170 (mm)×200 (mm)×3270 (μm). Specifications of the automobile cell of this Example were also indicated in Tables 1, 2 listed below.

EXAMPLE 5

Using the same electrodes as those of Example 4 in the present Example 5, the separators 6 are sequentially sandwiched and stacked between twenty one sheets of negative electrode plates 5 and twenty sheets of positive electrode plates 4 to form the electric power generating element 9a, to which the positive and negative electrode terminal leads 7, 8 with the thickness T3, T3' of 450 (μm) and the widths L5, L5' of 80 (mm) were connected, which was then encapsulated in the outer sheath laminate films 3 whereupon the circumferentially peripheral portions of the cell outer sheath materials 3 were thermally welded, thereby fabricating a flat automobile cell of a stack type.

A value of the maximum cell thickness T1/the active substance thickness T2+T2' of the unit electrode was 71, and a value of the unit cell surface area S7/the cell capacity CB was 73 (cm$^2$/Ah). The cell size was L6 (=L6')×L9×T1=170 (mm)×200 (mm)×4270 (μm). Specifications of the automobile cell of this Example were also indicated in Tables 1, 2 listed below.

EXAMPLE 6

In this Example 6, using the same electrodes as those of Example 1 except for that both the electrode plates 4, 5 had a surface area of 105 (cm$^2$), the separators 6 were sequentially sandwiched and stacked between eleven sheets of negative electrode plates 5 and ten sheets of positive electrode plates 4 to form the electric power generating element 9a, to which the positive and negative electrode terminal leads 7, 8 with the thickness T3, T3' of 200 (μm) and the widths L5, L5' of 30 (mm) were connected, which was then encapsulated in the outer sheath laminate films 3 whereupon the circumferentially peripheral portions of the cell outer sheath materials 3 were thermally welded, thereby fabricating a flat automobile cell of a stack type.

A value of the maximum cell thickness T1/the active substance thickness T2+T2' of the unit electrode was 29, and a value of the unit cell surface area S7/the cell capacity CB was 75 (cm$^2$/Ah). Also, a value of the negative-electrode terminal lead thickness T3'/negative-electrode current-collector total thickness m×T4' was 1.2, and a value of the positive-electrode terminal lead thickness T3/positive-electrode current-collector total thickness n×T4 was 1.3, with the widths L5, L5' of the electrode terminal leads to be taken out, respectively, being 40(%) of one side L6, L6' of the outer sheath laminate films from which the electrode terminal leads were taken out. The cell size was L6 (=L6')×L9×T1=75 (mm)×140 (mm)×3500 (μm). Specifications of the automobile cell of this Example were also indicated in Tables 1, 2 listed below.

EXAMPLE 7

This Example 7 was carried out in the same process as that of Example 6 except for that the widths L3, L3' of the respective electrode terminals leads were altered to be 45 (mm), thereby fabricating a flat automobile cell of a stack type, with the widths L3, L3' of the electrode terminal leads to be taken out, respectively, being 60(%) of one side L6, L6' of the outer sheath laminate films from which the electrode terminal leads are taken out.

A value of the maximum cell thickness T1/the active substance thickness T2+T2' of the unit electrode, a value of the unit cell surface area S7/the cell capacity CB, a value of the negative-electrode terminal lead thickness T3'/negative-electrode current-collector total thickness m×T4', a value of the positive-electrode terminal lead thickness T3/positive-electrode current-collector total thickness n×T4 and the cell size showed the same results as those of Example 6. Specifications of the automobile cell of this Example were also indicated in Tables 1, 2 listed below.

EXAMPLE 8

This Example 8 was carried out in the same process as that of Example 6 except for that the widths L3, L3' of the respective electrode terminals leads were altered to be 60 (mm), thereby fabricating a flat automobile cell of a stack type, with the widths L3, L3' of the electrode terminal leads to be taken out, respectively, being 80(%) of one side L6, L6' of the outer sheath laminate films from which the electrode terminal leads are taken out.

A value of the maximum cell thickness T1/the active substance thickness T2+T2' of the unit electrode, a value of the unit cell surface area S7/the cell capacity CB, a value of the negative-electrode terminal lead thickness T3'/negative-electrode current-collector total thickness m×T4', a value of the positive-electrode terminal lead thickness T3/positive-electrode current-collector total thickness n×T4 and the cell size showed the same results as those of Example 6. Specifications of the automobile cell of this Example were also indicated in Tables 1, 2 listed below.

EXAMPLE 9

This Example 9 was carried out in the same process as that of Example 6 except for that both the surface areas of the electrode plates 4, 5 were altered to be 105 (cm$^2$), and the separators 6 were sequentially sandwiched and stacked between eleven sheets of negative electrode plates 5 and ten sheets of positive electrode plates 4 to allow the electric power generating element 9a, to which the positive and negative electrode terminal leads 7, 8 with the thickness T3, T3' of 150 (μm) and the widths L5, L5' of 30 (mm) were connected, to be encapsulated in the outer sheath laminate films 3 whereupon the circumferentially peripheral portions of the cell outer sheath materials 3 were thermally welded, thereby fabricating a flat automobile cell of a stack type.

A value of the negative electrode thickness T3'/the negative-electrode current-collector total thickness m×T4' was 0.9, and a value of the positive-electrode terminal lead thickness T3/the positive-electrode current-collector total thickness n×T4 was 1.0, with the widths L5, L5' of the electrode terminal leads to be taken out, respectively, being 40(%) of one side L6, L6' of the outer sheath laminate films from which the electrode terminal leads are taken out. A value of the maximum cell thickness T1/the active substance thickness T2+T2' of the unit electrode, a value of the unit cell surface area S7/the cell capacity CB and the cell size of L6 (=L6')× L9×T1 showed the same results as those of Example 6. Specifications of the automobile cell of this Example were also indicated in Tables 1, 2 listed below.

EXAMPLE 10

This Example 10 was carried out in the same process as that of Example 9 except for that both the widths L5, L5' of the respective electrode terminals leads were altered to be 45 (mm), thereby fabricating a flat automobile cell of a stack type, with the widths L5, L5' of the electrode terminal leads to be taken out, respectively, being 60(%) of one side L6, L6' of the outer sheath laminate films from which the electrode terminal leads are taken out.

A value of the maximum cell thickness T1/the active substance thickness T2+T2' of the unit electrode, a value of the unit cell surface area S7/the cell capacity CB, a value of the negative-electrode terminal lead thickness T3'/negative-electrode current-collector total thickness m×T4' and a value of the positive-electrode terminal lead thickness T3/positive-electrode current-collector total thickness n×T4 showed the same results as those of Example 9. Also, the cell size L6 (=L6')×L9×T1 was the same as that of Example 6. Specifications of the automobile cell of this Example were also indicated in Tables 1, 2 listed below.

EXAMPLE 11

This Example 11 was carried out in the same process as that of Example 9 except for that both the widths L5, L5' of the respective electrode terminals leads were altered to be 60 (mm), thereby fabricating a flat automobile cell of a stack type, with the widths L5, L5' of the electrode terminal leads to be taken out, respectively, being 80(%) of one side L6, L6' of the outer sheath laminate films from which the electrode terminal leads were taken out.

A value of the maximum cell thickness T1/the active substance thickness T2+T2' of the unit electrode, a value of the unit cell surface area S7/the cell capacity CB, a value of the negative-electrode terminal lead thickness T3'/negative-electrode current-collector total thickness m×T4' and a value of the positive-electrode terminal lead thickness T3/positive-electrode current-collector total thickness n×T4 showed the same results as those of Example 9. Also, the cell size L6 (=L6')×L9×T1 was the same as that of Example 6. Specifications of the automobile cell of this Example were also indicated in Tables 1, 2 listed below.

EXAMPLE 12

This Example 12 was carried out in the same process as that of Example 6 except for that both the surface areas of the electrode plates 4, 5 were altered to be 105 (cm²), and the separators 6 were sequentially sandwiched and stacked between eleven sheets of negative electrode plates 5 and ten sheets of positive electrode plates 4 to form the electric power generating element 9a, to which the positive and negative electrode terminal leads 7, 8 with the thickness T3, T3' of 75 (μm) and the widths L5, L5' of 30 (mm) were connected, which was then encapsulated in the outer sheath laminate films 3 whereupon the circumferentially peripheral portions of the cell outer sheath materials 3 were thermally welded, thereby fabricating a flat automobile cell of a stack type.

A value of the negative electrode thickness T3'/the negative-electrode current-collector total thickness m×T4' was 0.5, and a value of the positive-electrode terminal lead thickness T3/the positive-electrode current-collector total thickness n×T4 was 0.5, with the widths L5, L5' of the electrode terminal leads to be taken out, respectively, being 40(%) of one side L6, L6' of the outer sheath laminate films from which the electrode terminal leads are taken out. A value of the maximum cell thickness T1/the active substance thickness T2+T2' of the unit electrode and a value of the unit cell surface area S7/the cell capacity CB and the cell size of L6 (=L6')× L9×T1 showed the same results as those of Example 6. Specifications of the automobile cell of this Example were also indicated in Tables 1, 2 listed below.

EXAMPLE 13

This Example 13 was carried out in the same process as that of Example 12 except for that both the widths L5, L5' of the respective electrode terminals leads were altered to be 45 (mm), thereby fabricating a flat automobile cell of a stack type, with the widths L5, L5' of the electrode terminal leads to be taken out, respectively, being 60(%) of one side L6, L6' of the outer sheath laminate films from which the electrode terminal leads were taken out.

A value of the maximum cell thickness T1/the active substance thickness T2+T2' of the unit electrode, a value of the unit cell surface area S7/the cell capacity CB, a value of the negative-electrode terminal lead thickness T3'/negative-electrode current-collector total thickness m×T4' and a value of the positive-electrode terminal lead thickness T3/positive-electrode current-collector total thickness n×T4 showed the same results as those of Example 12. Also, the cell size of L6 (=L6')×L9×T1 was the same as that of Example 6. Specifications of the automobile cell of this Example were also indicated in Tables 1, 2 listed below.

EXAMPLE 14

This Example 14 was carried out in the same process as that of Example 12 except for that both the widths L5, L5' of the respective electrode terminals leads were altered to be 60 (mm), thereby fabricating a flat automobile cell of a stack type, with the widths L5, L5' of the electrode terminal leads to be taken out, respectively, being 80(%) of one side L6, L6' of the outer sheath laminate films from which the electrode terminal leads are taken out.

A value of the maximum cell thickness T1/the active substance thickness T2+T2' of the unit electrode, a value of the unit cell surface area S7/the cell capacity CB, a value of the negative-electrode terminal lead thickness T3'/negative-electrode current-collector total thickness m×T4' and a value of the positive-electrode terminal lead thickness T3/positive-electrode current-collector total thickness n×T4 showed the same results as those of Example 12. Also, the cell size of L6 (=L6')×L9×T1 was the same as that of Example 6. Specifications of the automobile cell of this Example were also indicated in Tables 1, 2 listed below.

COMPARATIVE EXAMPLE 1

In this Comparative Example 1, a flat type automobile cell of a stack type was fabricated in a structure wherein the cell outer sheaths 3, composed of the polymer-metal composite laminate films, had circumferentially peripheral portions thermally welded to form the thermally welded portions 2 of which two opposing sides allowed the positive electrode terminal lead 7 and the negative electrode terminal lead 8 with the thickness T3, T3' of 100 (μm) and the widths of 80 (mm), respectively, to be taken out.

In particular, the positive electrode plate 4 was used in a structure wherein the positive electrode current collector 4a, made of aluminum foil with a thickness of 15 (μm), was coated with a slurry including the positive electrode active substance of $LiMn_2O_4$ and, in addition thereto, a mixture of PVdF, serving as the binder, and acetylene black serving as the electrically conductive promoting agent and dried to form the positive electrode active substance layers 4b on both sides of the positive electrode current collector 4a with each side in a thickness of 30 (μm) whereupon the same was cut in a rectangular shape of a surface area of 300 ($cm^2$). The negative electrode plate 5 was used in a structure wherein the negative electrode current collector 5a, made of copper foil with a thickness of 15 (μm), was coated with a slurry including a mixture of the negative electrode active substance of amorphous carbon, which was able to occlude and eliminate lithium ions, and PVdF serving as the binder and dried to form the negative electrode active substance layers 5b on both sides of the negative electrode current collector 5a with each side in a thickness of 30 (μm) whereupon the same was cut in a rectangular shape of a surface area of 300 ($cm^2$). As the separator 6, a separator with a thickness 25 (μm) made from polypropylene was used.

And, the separators are sandwiched and stacked between thirty one sheets of negative electrode plates 5 and thirty sheets of positive electrode plates 4 to form the electric power generating element 9a, to which the positive electrode terminal lead 7 and the negative electrode terminal lead 8 with the thickness T3, T3' of 100 (μm) and the widths L5, L5' of 80 (mm) were connected, which was then encapsulated in the outer sheath laminate films 3 whereupon the circumferentially peripheral portions of the cell outer sheath materials 3 were thermally welded to hermetically seal the electric power generating element 9a, thereby fabricating the flat automobile cell of the stack type.

A value of the maximum cell thickness T1/the active substance thickness T2+T2' of the unit electrode was 105, and a value of the unit cell surface area S7/the cell capacity CB was 48 ($cm^2$/Ah). A cell size was L6 (=L6')×L9×T1=170 (mm)×200 (mm)×6270 (μm). Specifications of the automobile cell of this Comparative Example were indicated in Tables 1, 2 listed below.

Property Evaluation 1 (Discharging Tests)

The flat type automobile cells 1 of Examples 1 to 14 and Comparative Example 1 were subjected to discharging tests for one hundred cycles and test results are indicated in Table 3 listed below. Also, automobile cells of the same number for each specification were prepared, and an average value was adopted for measured values unless a specific mention is made.

More particularly, tests were conducted for the batteries of Examples 3, 5 and for the cells of Comparative Example 1 each with the cell capacity CB having a value greater than 4 (Ah) at a rate of 100 A and for the cells of other Examples 1, 2, 4 and 6 to 14 at a rate of 50 A each in one cycle for one minute involving a discharging cycle for five seconds with a shutdown for five seconds, and resulting amounts of cell temperature rise were measured. Measured results are indicated in the following Table 3. Also, the temperature rises in the respective automobile cells were measured to obtain the temperature rises of the cells with a thermocouple being mounted onto the cell surface and performing discharging for five seconds in one hundred cycles at a current equivalent to a rate of 20 C. During measurements, the cell with the temperature rise of more than 30° C. was referred to an "improper cell" (NG) and the cell with the temperature rise of less than 30° C. was referred to a "proper cell" (OK).

Figure 10:
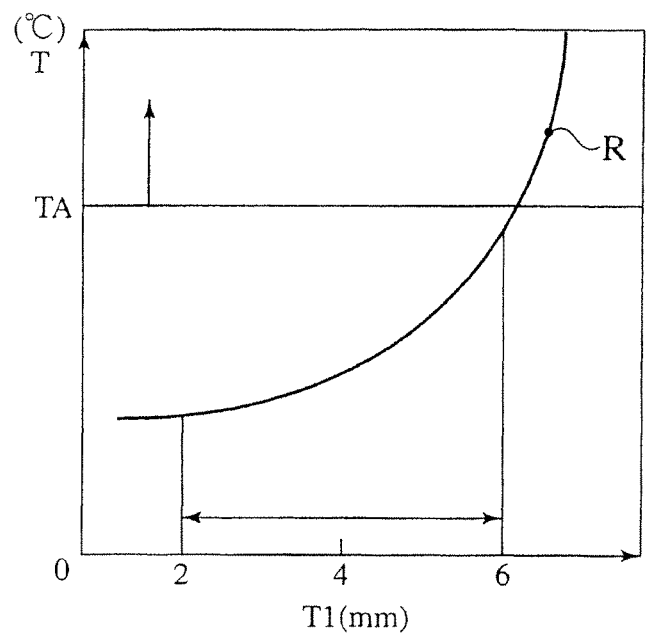
FIG. 10 is a graph illustrating the relationship between the maximum cell thickness T1 of the automobile cell and the cell temperature T during occurrence of discharging at one hundred cycles in Examples and in a Comparative Example of the presently filed embodiment.

Further, among the values of the maximum cell thickness T1/the active substance thickness T2+T2' of the unit electrodes, measurement was further conducted for the battery with the maximum cell thickness T1 falling in a preferable range. FIG. 10 shows the relationship between the maximum thickness T1 of each automobile cell and the cell temperature T occurring when performing discharging for one hundred cycles. In the figure, a dot "R" represents a measured result of Comparative Example 1.

As seen from FIG. 10, it was confirmed that even in anticipation of variations in products, the presence of the maximum cell thickness T1 laying in a value less than 6 (mm) reliably enables the temperature rise, occurring when performing discharging for one hundred cycles, to be suppressed to a value less than the temperature TA, at which power output limiting of a vehicle system is commanded, to provide a capability of satisfying a demanded performance of the motor drive battery for EV, HEV and FCV. However, even in a case where the maximum cell thickness T1 lies in the value greater than 6 (mm), if the value of the maximum cell thickness T1/the active substance thickness T2+T2' of the unit electrode satisfies the range equal to or less than 80, the cell has an excellent heat dissipating property and, hence, it is possible to restrict the cell temperature from being raised.

Further, use was made for separators 6 to be used in the automobile lithium ion cell to be installed on EV, HEV and FCV with a thickness equal to or greater than 20 (μm), selected for preventing the occurrence of micro short-circuiting to be caused by impurities contaminated during the manufacturing steps or the missing of the electrode active substance, and equal to or less than 50 (μm) to suit the high power applications for the automobiles. Likewise, use was made the electrode current collectors 4a, 5a with a thickness equal to or greater than 10 (μm) and equal to or less than 20 (μm) to provide the high power output. Also, the thickness of one side of both the positive electrode and negative electrode active substance layers 4b, 5b was selected to fall in a range equal to or less than 80 (μm) and in a range equal to or greater than 20

(μm) due to film qualities and limited use of coating apparatuses.

With the structure set forth above, the presence of the maximum cell thickness falling in the value equal to or greater than 2 (mm) increases the ratio of materials of the electrode current collectors 4a, 5a, the separators 6 and the outer sheath materials 3 except for the active substances of the cell 1, thereby minimizing reduction in the volumetric efficiency to the minimum. However, even in the presence of the maximum cell thickness of the value less than 2 (mm), like in Example 1, if the value of the maximum cell thickness T1/the active substance thickness T2+T2' of the unit electrode satisfies the range equal to or less than 80, the cell has an excellent heat dissipating property and, thus, it is possible to restrict the cell temperature from being raised as indicated in the following Table 3.

Further, since the motor drive battery for EV, HEV and FCV is required to have a high power output and high energy density, in normal practice, since no probability exists where a single automobile cell (unit cell) is used and a plurality of unit cells are presupposed to be connected in series or parallel to form a battery, it is a general practice for a single flat automobile cell to have a cell capacity in a range from 1.5 to 6 (Ah). In this instance, the automobile cell is configured so as to have the maximum length L9 of the side, other than those in which the electrode terminal leads 7, 8 are sandwiched between the thermally welded portions 2 of the outer sheath laminate films 3 and exposed to the outside of the cell outer sheath 3, falling in the range equal to or less than 250 (mm) and the value of unit cell surface area S7/cell capacity CB falling in the range equal to or greater than 30 (cm²/Ah). From the cell specifications of the following Tables 1, 2 and the measured results of Table 3, in the presence of the maximum length L9 of the side, other than those in which the electrode terminal leads 7, 8 are sandwiched between the thermally welded portions 2 of the outer sheath laminate films 3 and exposed to the outside of the cell outer sheath 3, falling in the range equal to or less than 250 (mm) and the value of unit cell surface area S7/cell capacity CB falling in the range equal to or greater than 30 (cm²/Ah), an excellent heat dissipating property can be realized, enabling the cell temperature from being raised. For this reason, it is possible for the temperature rise, occurring when performing discharging, to be suppressed to a value less than the temperature TA, at which power output limiting of a vehicle system is commanded, to provide a capability of satisfying a demanded performance of the motor drive battery for EV, HEV and FCV.

Property Evaluation 2 (Nail Driving Tests)

Nail driving tests were conducted for the flat type automobile cells of Examples 1 to 14 and Comparative Example 1, and test results are indicated in the following Table 3. Also, three pieces of automobile cells of the respective Examples and Comparative Example were prepared and an average value was adopted for measured values unless a specific mentions is made.

In particular, on the basis of the results indicated in FIG. 10, cell-in-trouble confirmation tests (in nail driving tests) were conducted for the automobile cells of Examples 2 to 14 where the maximum cell thickness T1 was selected to fall in the range equal to or greater than 2 (mm) and equal to or less than 6 (mm) and for the automobile cells of Example 1 and Comparative Example 1 where the maximum cell thickness T1 was out of the range between 2 (mm) and 6 (mm) and where the value of the maximum cell thickness T1/the active substance thickness T2+T2' of the unit electrodes was altered. Nails used in the nail driving tests had a diameter of 5 (mm), and the nails were penetrated into respective batteries at a penetrating speed of 10 (cm/s) whereupon spout of electrolyte solvent were recognized visually. Here, the automobile cells of Example 1 and Comparative Example 1 where the maximum cell thickness T1 was out of the range between 2 (mm) and 6 (mm) have the value of the maximum cell thickness T1/the active substance thickness T2+T2' of the unit electrode falling in the range different from those of other Examples. Also, all of the respective cells are preliminarily adjusted at DOD in the vicinity of 0(%).

From the results of the following Table 3, it appears that the presence of the value of the maximum cell thickness T1/the active substance thickness T2+T2' of the unit electrode falling in the range equal to or less than 80 and, more preferably, in a range equal to or greater than 10 and equal to or less than 80 enables the cell temperature, occurring when performing the charging and discharging cycles at a large electric current, to be restricted from being raised, resulting in improved life cycle characteristics and further excellent reliabilities during troubled situations.

Property Evaluation 3 (Leaving Tests and Charging and Discharging Tests)

The flat type automobile cells of Examples 1 to 14 and Comparative Example 1 were left in an atmosphere of 40° C. for sixty days and, thereafter, the presence of or absence of leaked solvent from the cells were confirmed. Also, the temperature rises in the electrode terminal leads of the respective automobile cells during the charging and discharging cycles were measured to obtain the temperature rises of the terminals with a thermocouple (K-thermocouple) being mounted onto a surface central area of the electrode terminal lead under which discharging was repeated for five seconds in one hundred cycles at a current equivalent to a rate of 20 C. During measurements, the cell with the temperature rise of more than 30° C. was referred to an "improper cell" (NG) and the battery with the temperature rise of less than 30° C. was referred to a "proper cell" (OK). These test results are indicated in the following Table 3, with results obtained by conducting further studies being indicated in FIGS. 11 and 12. Also, three pieces of automobile cells of the respective Examples and Comparative Example were prepared and an average value was adopted for measured values unless a specific mentions is made.

Figure 11:
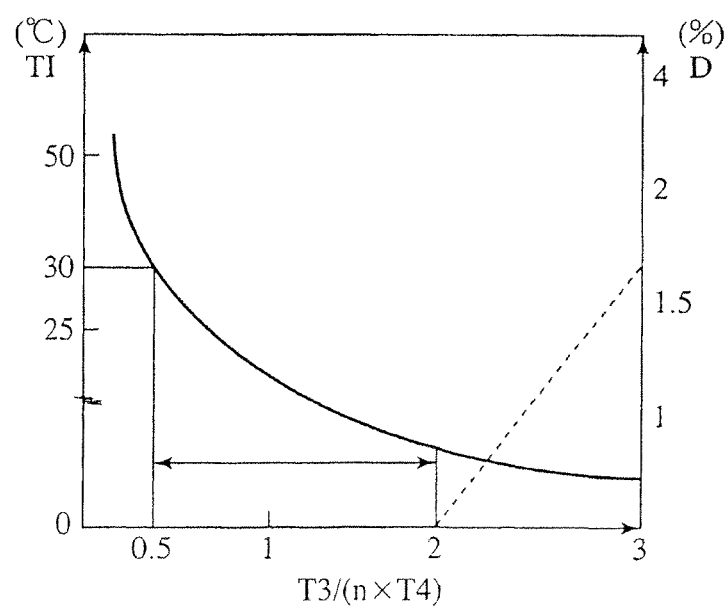
FIG. 11 is a graph illustrating the relationship between a value of positive-electrode terminal lead thickness T3/total thickness n×T4 of positive electrode current collectors, and a temperature rise amount TI of the positive electrode terminal lead 7 and a sealing defective rate D in the Examples and in a Comparative Example of the presently filed embodiment.

FIG. 11 represents the relationship between the value of the positive-electrode terminal lead thickness T3/positive-electrode current-collector total thickness n×T4, and the amount TI of temperature rise in the positive electrode terminal lead 7 and a sealing defective rate D, typically in terms of the positive electrode to be indicative of the relationship between the thickness T3, T3' of the electrode terminal leads 7, 8 and the total thickness n×T4, m×T4' of the electrode current collectors. Also, the left ordinate axis represents the temperature rise amount TI in the positive electrode terminal lead 7, and the right ordinate axis represents the sealing defective rate D. Moreover, in connection with the temperature rise amount TI, the highest temperature rise amount TI among the temperature rise amounts of the positive electrode terminal lead 7 with respect to the preceding temperature of the positive electrode terminal lead 7 prior to measurement was adopted. Additionally, in conjunction with the sealing defective rate D, three pieces of automobile cells for each of respective Examples and Comparative Example were left in a thermostat at a temperature of 40° C. (with no control in humidity) for sixty days and, thereafter, confirmations of the presence of or absence of leakages of liquid were carried out visually through the use of litmus papers. The sealing defective rate D (%) was calculated on the basis of a ratio of the number of batteries, which were suffered from leakage of liquid, with respect to a total number of batteries.

Figure 12:
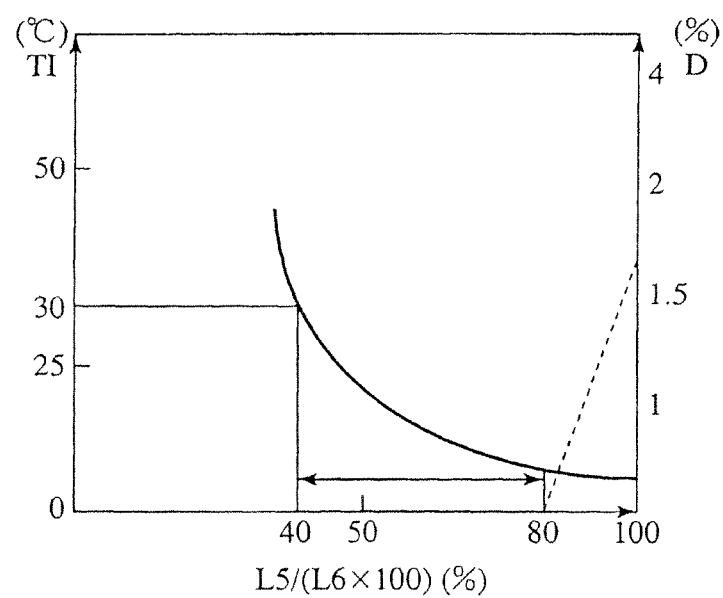
FIG. 12 is a graph illustrating the relationship between a value (% in conversion) of a positive-electrode terminal lead width L5/a cell width L6, and the temperature rise amount TI of the positive electrode terminal lead 7 and the sealing defective rate D in Examples and in Comparative Example of the presently filed embodiment.

FIG. 12 represents the relationship between the value (in conversion of %) of the positive-electrode terminal lead width L5/cell width L6, and the temperature rise amount TI in the positive electrode terminal lead 7 and the sealing defective rate D typically in terms of the positive electrode under the relationship between the value of the widths L5, L5' of the positive electrode terminal leads 7, 8 and the cell width L6 (=L6'). Also, the left ordinate axis represents the temperature rise amount TI in the positive electrode terminal lead 7, and the right ordinate axis represents the sealing defective rate D. Moreover, in connection with the temperature rise amount TI, the highest temperature rise amount among the temperature rise amounts of the positive electrode terminal lead 7 with respect to the preceding temperature of the positive electrode terminal lead 7 prior to measurement was adopted. Additionally, in conjunction with the sealing defective rate D, three pieces of automobile cells for each of respective Examples and Comparative Example were left in the thermostat at a temperature of 40° C. (with no control in humidity) for sixty days and, thereafter, confirmations of the presence of or absence of leakages of liquid were carried out visually through the use of litmus papers. The sealing defective rate D (%) was calculated on the basis of a ratio of the number of pieces of the batteries suffered from leakage of liquid relative to the total number of batteries subjected to the outstanding tests.

As apparent from FIG. 11, it is cleared that the presence of the ratio between the thickness T3 of the positive terminal lead 7 and the total thickness n×T4 of the positive electrode current collectors 4*a* falling in the range equal to or greater than 0.4 and equal to or less than 2.0 ensures a favorable sealing property to provide a capability of limiting the temperature rise of the positive electrode terminal lead 7 to a level below 30° C. Such situations were also similarly found in the cell with the ratio (T3'/m×T4') between the negative terminal lead thickness T3' and the total thickness m×T4' of the negative electrode current collectors 5*a*.

In such a way, by limiting the temperature rise of the electrode terminal leads 7, 8 to the level below 30° C., the automobile cell 1 using the laminate sheets as the cell outer sheath materials 3 is enabled to eliminate the sealing property from being damaged resulting from an increase in an internal pressure caused by the temperature rise of the cell 1. Especially, in an event that the automobile cell 1 is installed on EV, HEV and FCV, a provability occurs where the cell temperature rises even at a temperature of approximately 60° C. Under such a circumstance, due to a large electric current flowing through the electrode terminal leads 7, 8 during the charging and discharging cycles, it is conceivable that the temperatures of the electrode terminal leads 7, 8 further increase to a higher level than the cell temperature by a value above 30° C. to exceed a softening point (at a temperature of approximately 90° C.) of resin contained in the outer sheath laminate films. Under such a situation, due to an increase in internal pressure of the cell, degradations conceivably occur in the sealing properties of the thermally welded portions 2 of the cell outer sheath materials 3 in contact with the electrode terminal leads 7, 8. However, the presence of the ratio, between the electrode terminal lead thickness T3, T3' and the total thickness n×T4, m×T4' of the electrode current collectors, falling in the above-described range enables the temperature rises of the electrode terminal leads to be limited to an appropriate temperature range in which no such a circumstance occurs.

As apparent from FIG. 12, further, in the presence of the positive terminal lead 7 with the width L5 laying in a range equal to or greater than 40(%) and equal to ore less than 80(%) of the length of the side of the outer sheath laminate film 3 from which the positive electrode terminal lead 7 is taken out, a favorable sealing property is enhanced to enable the temperature rise of the electrode terminal lead to be limited to the value less than 30° C., providing the same advantageous effects as those previously mentioned. Such advantageous effects were similarly realized even in the presence of the negative electrode terminal lead with the width L5' laying in a range equal to or greater than 40(%) and equal to or less than 80(%) of the length L6' (=L6) of the side of the outer sheath laminate film 3 from which the negative electrode terminal lead 7 is taken out.

TABLE 1

|  | Cell Max. Thick. T1 (μm) | Active Sub. Aver. Thick, of Unit Cell T2 + T2' (μm) | Cell Max. Thick./Active Sub. Aver. Thick. of Unit Cell T1/(T2 + T2') | Terminal Lead Material | Max. Length of Side L9 (mm) | Unit Cell Surf. Area S7 (cm$^2$) | Cell Capac. CB (Ah) | Unit Cell Surf. Area/ Cell Capac. S7/CB (cm$^2$/Ah) |
|---|---|---|---|---|---|---|---|---|
| Exam. 1 | 1800 | 120 | 15 | +Al/−Ni | 200 | 300 | 1.7 | 176 |
| Exam. 2 | 3500 | 120 | 29 | +Al/−Ni | 200 | 300 | 3.8 | 79 |
| Exam. 3 | 5100 | 120 | 43 | +Al/−Ni | 200 | 300 | 6 | 50 |
| Exam. 4 | 3270 | 60 | 55 | +Al/−Ni | 200 | 300 | 3 | 100 |
| Exam. 5 | 4270 | 60 | 71 | +Al/−Ni | 200 | 300 | 1.4 | 73 |
| Exam. 6 | 3500 | 120 | 29 | +Al/−Ni | 140 | 105 | 1.4 | 75 |
| Exam. 7 | 3500 | 120 | 29 | +Al/−Ni | 140 | 105 | 1.4 | 75 |
| Exam. 8 | 3500 | 120 | 29 | +Al/−Ni | 140 | 105 | 1.4 | 75 |
| Exam. 9 | 3500 | 120 | 29 | +Al/−Ni | 140 | 105 | 1.4 | 75 |
| Exam. 10 | 3500 | 120 | 29 | +Al/−Ni | 140 | 105 | 1.4 | 75 |
| Exam. 11 | 3500 | 120 | 29 | +Al/−Ni | 140 | 105 | 1.4 | 75 |
| Exam. 12 | 3500 | 120 | 29 | +Al/−Ni | 140 | 105 | 1.4 | 75 |
| Exam. 13 | 3500 | 120 | 29 | +Al/−Ni | 140 | 105 | 1.4 | 75 |
| Exam. 14 | 3500 | 120 | 29 | +Al/−Ni | 140 | 105 | 1.4 | 75 |
| Com. Exam. 1 | 6270 | 60 | 105 | +Al/−Ni | 200 | 300 | 6.2 | 48 |

TABLE 2

| | Elec. Term. Lead Thick. T3, T3' (μm) | Total Thick. of Nega. (Posit.) Elec. Current Collect. m × T4', n × T4 (μm) | Elec. Term. Lead Thick./Total Thick. of Nega. (Posit.) Elec. Current Collec. T3, T3'/(m × T4'), (n × T4) | Term. Lead Width L5, L5' (mm) | Length of One Side of Laminate Film L6, L6' (mm) | Term. Lead Width/ Length of One Side of Laminate Film L5, L5'/L6, L6' × 100 (%) |
|---|---|---|---|---|---|---|
| Exam. 1 | 100 | 90 (75) | 1.3 (1.1) | 80 | 170 | 47 |
| Exam. 2 | 200 | 165 (150) | 1.2 (1.3) | 80 | 170 | 47 |
| Exam. 3 | 200 | 240 (225) | 0.8 (0.9) | 80 | 170 | 47 |
| Exam. 4 | 200 | 240 (225) | 0.8 (0.9) | 80 | 170 | 47 |
| Exam. 5 | 450 | 315 (300) | 1.4 (1.5) | 80 | 170 | 47 |
| Exam. 6 | 200 | 165 (150) | 1.2 (1.3) | 30 | 75 | 40 |
| Exam. 7 | 200 | 165 (150) | 1.2 (1.3) | 45 | 75 | 60 |
| Exam. 8 | 200 | 165 (150) | 1.2 (1.3) | 60 | 75 | 80 |
| Exam. 9 | 150 | 165 (150) | 0.9 (1.0) | 30 | 75 | 40 |
| Exam. 10 | 150 | 165 (150) | 0.9 (1.0) | 45 | 75 | 60 |
| Exam. 11 | 150 | 165 (150) | 0.9 (1.0) | 60 | 75 | 80 |
| Exam. 12 | 75 | 165 (150) | 0.5 (0.5) | 30 | 75 | 40 |
| Exam. 13 | 75 | 165 (150) | 0.5 (0.5) | 45 | 75 | 60 |
| Exam. 14 | 75 | 165 (150) | 0.5 (0.5) | 60 | 75 | 80 |
| Com. Exam. 1 | 100 | 465 (450) | 0.2 (0.2) | 80 | 170 | 47 |

TABLE 3

| | Temp. Rise Amount in Cell Surface During Discharging Tests for 100 Cycles | Presence of or Absence of Effusion caused by Nail Driving Test | Presence of or Absence of Leaked Liquid caused by Leaving Test for Sixty Days at 40° C. | Temperature Rise Amount in Terminals During Charging and Discharging |
|---|---|---|---|---|
| Exam. 1 | OK | None | None | OK |
| Exam. 2 | OK | None | None | OK |
| Exam. 3 | OK | None | None | OK |
| Exam. 4 | OK | None | None | OK |
| Exam. 5 | OK | None | None | OK |
| Exam. 6 | OK | None | None | OK |
| Exam. 7 | OK | None | None | OK |
| Exam. 8 | OK | None | None | OK |
| Exam. 9 | OK | None | None | OK |
| Exam. 10 | OK | None | None | OK |
| Exam. 11 | OK | None | None | OK |
| Exam. 12 | OK | None | None | OK |
| Exam. 13 | OK | None | None | OK |
| Exam. 14 | OK | None | None | OK |
| Com. 1 | NG | Slightly Recognized | None | NG |

According the structures of the presently filed embodiment set forth above, the temperature rise of the cell during the charging and discharging cycles at a large electric current is limited to enhance a favorable sealing property, thereby enabling the life cycle characteristic of the cell to be improved. Further, when manufacturing the battery or the battery module to be installed in vehicles such as EV, HEV and FCV as prime power supplies for driving motors thereof, it becomes possible to comply with requirements for a desired battery capacity and power output every for application purposes at a relatively low cost without a need for newly manufacturing a battery (unit cell or battery).

The entire content of a Patent Application No. TOKUGAN 2002-227423 with a filing date of Aug. 5, 2002 in Japan is hereby incorporated by reference.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A flat-shaped cell for an automobile, the cell comprising:
    an electric power generating element made flat-shaped cell by laminating a positive electrode provided with a positive electrode current collector and a positive electrode active substance layer formed on the positive electrode current collector, a separator, and a negative electrode provided with a negative electrode current collector and a negative electrode active substance layer formed on the negative electrode current collector;
    a cell outer sheath made of a polymer-metal composite laminate film for sealing the electric power generating element therein;
    a positive electrode terminal lead electrically connected with the positive electrode and extended outward from the cell outer sheath;

a negative electrode terminal lead electrically connected with the negative electrode and extended outward from the cell outer sheath, wherein the electric power generating element is sealed in the cell outer sheath by forming welded portions along a circumferential edge of two sheets of the laminate films or by forming welded portions for sealing an opening of an envelope made of one sheet of the laminate film, the positive electrode current collector and the negative electrode current collector are made of foil, the positive electrode terminal lead is extended outward from the cell outer sheath with sandwiched between the welded portions, the negative electrode terminal lead is extended outward from the cell outer sheath with sandwiched between the welded portions, the positive electrode terminal lead and the negative electrode terminal lead are plate-shaped, a ratio of a total thickness of the cell to a sum of a thickness of a single layer of the positive electrode active substance layer and a thickness of a single layer of the negative electrode active substance layer is equal-to or smaller-than 80, a ratio of a thickness of the positive electrode terminal lead to a total thickness of the positive electrode current collector is equal-to or larger-than 0.4 and equal-to or smaller-than 2.0, and a ratio of a thickness of the negative electrode terminal lead to a total thickness of the negative electrode current collector is equal-to or larger-than 0.4 and equal-to or smaller-than 2.0.

2. The cell according to claim 1, wherein
a maximum length of sides of the cell outer sheath from which the positive electrode terminal lead and the negative electrode terminal lead are not extended outward is equal-to or shorter-than 250 mm, and
a ratio of a unit cell surface area that is a larger area between a surface area of a single layer of the positive electrode active substance layer and a surface area of a single layer of the negative electrode active substance layer to a cell capacity of the cell is equal-to or larger-than 30 $cm^2$/Ah.

3. The cell according to claim 1, wherein
a width of the positive electrode terminal lead is equal-to or larger-than 40% and equal-to or smaller-than 80% of a length of a side of the cell outer sheath from which the positive electrode terminal lead is extended outward,
a width of the negative electrode terminal lead is equal-to or larger-than 40% and equal-to or smaller-than 80% of a length of a side of the cell outer sheath from which the negative electrode terminal lead is extended outward, and
the side of the cell outer sheath from which the positive electrode terminal lead is extended outward and the side of the cell outer sheath from which the negative electrode terminal lead is extended outward are different from each other.

4. The cell according to claim 1, wherein
the positive electrode terminal lead is made of Ni, Cu, Al, Fe, alloy including at least one of these metals, or one of these materials coated with Ni, Ag or Au, and
the negative electrode terminal lead is made of Ni, Cu, Al, Fe, alloy including at least one of these metals, or one of these materials coated with Ni, Ag or Au.

5. The cell according to claim 1, wherein
an average thickness of the positive electrode active substance layer is equal-to or larger-than 20 μm and equal-to or smaller-than 80 μm, and
an average thickness of the negative electrode active substance layer is equal-to or larger-than 20 μm and equal-to or smaller-than 80 μm.

6. A battery comprising:
at least one group including a plurality of the cells according to claim 1 that are electrically connected in parallel or in series, wherein
the cells are stacked in the group and electrically connected in parallel or in series by welding the positive electrode terminal leads and the negative electrode terminal leads along a stacking direction.

7. A battery comprising:
at least one group including a plurality of the cells according to claim 1 that are electrically connected in parallel or in series, wherein
the cells are laterally aligned side by side in the group and electrically connected in parallel or in series by welding the positive electrode terminal leads and the negative electrode terminal leads by use of bus bars extended laterally.

8. A battery module comprising:
a plurality of the batteries according to claim 6, wherein
the batteries are electrically connected in parallel, in series, or in combination of parallel and series.

9. A battery module comprising:
a plurality of the batteries according to claim 7, wherein
the batteries are electrically connected in parallel, in series, or in combination of parallel and series.

10. An automobile comprising:
the battery according to claim 6.

11. An automobile comprising:
the battery according to claim 7.

12. An automobile comprising:
the battery module according to claim 8.

13. An automobile comprising:
the battery module according to claim 9.

* * * * *